(12) United States Patent
Lu et al.

(10) Patent No.: US 12,389,117 B2
(45) Date of Patent: Aug. 12, 2025

(54) IMAGE PHOTOGRAPHING METHOD, DEVICE, STORAGE MEDIUM, AND PROGRAM PRODUCT

(71) Applicant: Honor Device Co., Ltd., Shenzhen (CN)

(72) Inventors: Shengqing Lu, Shenzhen (CN); Yu Wang, Shenzhen (CN); Zhiqi Li, Shenzhen (CN); Congchao Zhu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/278,923

(22) PCT Filed: Jul. 22, 2022

(86) PCT No.: PCT/CN2022/107449
§ 371 (c)(1),
(2) Date: Aug. 25, 2023

(87) PCT Pub. No.: WO2023/016232
PCT Pub. Date: Feb. 16, 2023

(65) Prior Publication Data
US 2024/0056685 A1  Feb. 15, 2024

(30) Foreign Application Priority Data

Aug. 12, 2021 (CN) .......................... 202110928106.8
Sep. 6, 2021 (CN) .......................... 202111040576.7

(51) Int. Cl.
*H04N 23/68* (2023.01)
*H04N 5/262* (2006.01)
(Continued)

(52) U.S. Cl.
CPC ......... *H04N 23/683* (2023.01); *H04N 5/2628* (2013.01); *H04N 23/632* (2023.01);
(Continued)

(58) Field of Classification Search
None
See application file for complete search history.

(56) References Cited

U.S. PATENT DOCUMENTS 11,044,407 B2   6/2021  Jeong et al.
12,149,817 B2 * 11/2024  Wang .................. H04N 23/635
(Continued)

FOREIGN PATENT DOCUMENTS

CN        106454132 A      2/2017
CN        106657780 A      5/2017
(Continued)

*Primary Examiner* — James M Hannett
(74) *Attorney, Agent, or Firm* — Leydig, Voit & Mayer, Ltd.

(57) ABSTRACT

Provided are an image photographing method, a device, a storage medium, and a program product. The method includes: displaying a first preview interface of a camera application, where the first preview interface includes a first preview image, the first preview image is obtained after processing a first image collected by a camera, the first preview image corresponds to a first zoom ratio, and the first image corresponds to a first output mode of the camera; receiving a first operation performed by a user; and displaying a second preview interface of the camera application in response to the first operation, where the second preview interface includes a second preview image, the second preview image is obtained after processing a second image collected by the camera, the second preview image corresponds to a second zoom ratio, and the second image corresponds to a second output mode of the camera.

20 Claims, 26 Drawing Sheets

(51) Int. Cl.
    *H04N 23/63*     (2023.01)
    *H04N 23/667*     (2023.01)
    *H04N 23/69*     (2023.01)
    *H04N 23/71*     (2023.01)

(52) U.S. Cl.
    CPC ......... *H04N 23/667* (2023.01); *H04N 23/685* (2023.01); *H04N 23/69* (2023.01); *H04N 23/71* (2023.01)

(56) References Cited

U.S. PATENT DOCUMENTS

| | | | |
|---|---|---|---|
| 2016/0316147 A1* | 10/2016 | Bernstein | G06F 3/04842 |
| 2017/0034410 A1 | 2/2017 | Yoo et al. | |
| 2021/0067749 A1* | 3/2021 | Yadav | H04N 25/135 |
| 2021/0218898 A1* | 7/2021 | Moon | H04N 23/631 |
| 2023/0188826 A1* | 6/2023 | Wu | H04N 23/80 |
| | | | 348/222.1 |
| 2023/0421889 A1* | 12/2023 | Cui | H04N 23/69 |
| 2024/0031675 A1* | 1/2024 | Tian | G06V 10/761 |
| 2024/0244311 A1* | 7/2024 | Tang | H04N 23/632 |
| 2025/0004799 A1* | 1/2025 | Li | G06F 9/451 |

FOREIGN PATENT DOCUMENTS

| | | |
|---|---|---|
| CN | 107317969 A | 11/2017 |
| CN | 109089036 A | 12/2018 |
| CN | 109831621 A | 5/2019 |
| CN | 110784651 A | 2/2020 |
| CN | 110855896 A | 2/2020 |
| CN | 110876027 A | 3/2020 |
| CN | 110933302 A | 3/2020 |
| CN | 110958387 A | 4/2020 |
| CN | 111010506 A | 4/2020 |
| CN | 111107265 A | 5/2020 |
| CN | 114007011 A | 2/2022 |
| JP | 2012105171 A | 5/2012 |

\* cited by examiner

Before the stabilization function is turned on

CONT.
FROM

After a stabilization function is turned on

IMAGE PHOTOGRAPHING METHOD, DEVICE, STORAGE MEDIUM, AND PROGRAM PRODUCT

CROSS-REFERENCE TO RELATED APPLICATIONS

This application is a national stage of International Application No. PCT/CN2022/107449, filed on Jul. 22, 2022, which claims priority to Chinese Patent Application No. 202110928106.8, filed on Aug. 12, 2021, and Chinese Patent Application No. 202111040576.7, filed on Sep. 6, 2021. The disclosures of all of the aforementioned applications are hereby incorporated by reference in their entireties.

TECHNICAL FIELD

This application relates to the field of computer technologies, and specifically, to an image photographing method, a device, a storage medium, and a program product.

BACKGROUND

Mobile phone imaging technology is increasingly developed. In daily office or life, people are increasingly accustomed to using a mobile phone to capture bits and pieces of life or work at any time. Generally, the mobile phone is taken directly by hand to shoot without the support of an external device. In order to get a clearer and desired imaging effect, people tend to hold their hands as steady as possible to stabilize a photo preview interface before shooting as much as possible. However, the image stabilization of the hands is usually limited and cannot be completely still. Therefore, in a process of taking a picture with a handheld mobile phone, image shaking is inevitably accompanied.

Once the body or the hand shakes during the taking of the picture, the picture is become blurred. Especially when the photo preview interface magnifies the image by a certain ratio, the shake presented on a mobile phone screen is also enlarged, making it difficult to obtain a stable camera preview screen, which affects the user experience.

SUMMARY

In order to solve the above technical problems, this application provides an image photographing method, a device, a storage medium, and a program product. According to this method, in a scenario captured by a handheld phone, the image captured by the camera is processed based on different zoom ratios of a user on a photo preview interface of a camera application, and then the image after image stabilization is displayed on the photo preview interface, so as to reduce an image shake generated by the user when photographing with the handheld phone and improve photographing experience of the user.

According to a first aspect, an image photographing method is provided. The method includes: displaying a first preview interface of a camera application, where the first preview interface includes a first preview image, the first preview image is obtained after processing a first image collected by a camera, the first preview image corresponds to a first zoom ratio, and the first image corresponds to a first output mode of the camera; receiving a first operation performed by a user; and displaying a second preview interface of the camera application in response to the first operation, where the second preview interface includes a second preview image, the second preview image is obtained after processing a second image collected by the camera, the second preview image corresponds to a second zoom ratio, the second image corresponds to a second output mode of the camera, the second output mode is different from the first output mode, and the second zoom ratio is different from the first zoom ratio. In this way, in the scenario of taking pictures with the mobile phone, when a current camera application is on the first preview interface of the first zoom ratio, the first output mode is corresponded. Based on a zoom operation of the user, a focal length changes to the second zoom ratio, and the photo preview interface of the camera application displays the second preview interface, which corresponds to the second output mode, thereby realizing that when taking pictures with the handheld phone, different output modes are displayed on the photo preview interface based on the different zoom ratios. With different output modes, resolution and sharpness of an image of the photo preview interface of the camera application can be optimized under different lighting conditions.

For example, the camera application is a system camera application on a mobile phone or a tablet.

For example, the first preview interface and the second preview are the photo preview interface of the camera application.

According to a first aspect, the first output mode is one of Binning, Remosaic, Quadra, Quadra HDR, or Stagger HDR. In this way, through different output modes, the resolution and the sharpness of the image of the photo preview interface of the camera application can be optimized under different lighting conditions.

According to a first aspect, the second output mode is one of Binning, Remosaic, Quadra, Quadra HDR, or Stagger HDR. In this way, through different output modes, the resolution and the sharpness of the image of the photo preview interface of the camera application can be optimized under different lighting conditions.

According to the first aspect or any one of the above implementations in the first aspect, the image photographing method further includes the first output mode or the second output mode is determined based on a photographing brightness of the camera. In this way, based on different photographing brightness, the output mode is adjusted, the resolution and the sharpness of the image of the photo preview interface of the camera application are improved, and user experience are improved. It is especially suitable for a night scenario, such as when an outdoor night scenario needs to be photographed, and the indoor photographing brightness is bright. In this case, the image displayed on the photo preview interface of the camera application should be an outdoor night scenario, and due to the indoor lighting, the current brightness may be determined according to the indoor light, thereby affecting the effect of night scenario photographing. In the embodiment of the present disclosure, the photographing brightness of the photo preview interface is determined according to the outdoor brightness in the current scenario. That is, the photographing brightness in this case is determined as dark light based on the outdoor night scenario, thereby changing the output mode and improving the resolution and the sharpness of the image of the photo preview interface of the camera application.

According to the first aspect or any one of the above implementations in the first aspect, the photographing brightness is determined based on a current ambient light brightness collected by an ambient light sensor. In this way, the current photographing brightness can be accurately reflected, so that different output modes can be displayed based on the current photographing brightness, and the resolution and the sharpness of the image of the photo preview interface of the camera application under different lighting conditions can be optimized.

According to the first aspect or any one of the above implementations in the first aspect, the photographing brightness is determined based on average brightness information of the second preview image. In this way, the current photographing brightness can be accurately reflected, so that different output modes can be displayed based on the current photographing brightness, and the resolution and the sharpness of the image of the photo preview interface of the camera application under different lighting conditions can be optimized.

According to the first aspect or any one of the above implementations in the first aspect, the photographing brightness includes bright light and dark light. In this way, different output modes can be displayed based on the current photographing brightness, and the resolution and the sharpness of the image of the photo preview interface of the camera application under different lighting conditions can be optimized.

According to the first aspect or any one of the implementations of the first aspect, when the photographing brightness is dark, the first output mode is Binning. In this way, the resolution and the sharpness of the image of the photo preview interface of the camera application can be optimized under the dark light condition.

According to the first aspect or any one of the implementations of the first aspect, when the photographing brightness is dark, the second output mode is Binning. In this way, the resolution and the sharpness of the image of the photo preview interface of the camera application can be optimized under the dark light condition.

According to the first aspect or any one of the implementations of the first aspect, when the photographing brightness is bright, the first output mode is Remosaic. In this way, the resolution and the sharpness of the image of the photo preview interface of the camera application can be optimized under the bright light condition.

According to the first aspect or any one of the implementations of the first aspect, when the photographing brightness is bright, the second output mode is Remosaic. In this way, the resolution and the sharpness of the image of the photo preview interface of the camera application can be optimized under the bright light condition.

According to the first aspect or any one of the above implementations in the first aspect, the first operation includes one of a gesture operation for zooming the first preview image, a screen tap operation, or dragging a zoom progress bar. In this way, based on habits of the user or different styles of the phones, the user can zoom the preview image in a plurality of manners to improve user experience.

According to the first aspect or any one of the implementations of the first aspect, the photographing brightness of the first preview interface and the second preview interface is bright.

According to the first aspect or any one of the above implementations in the first aspect, the method further includes: displaying, by the camera application, a third preview interface in response to the photographing brightness being switched to dark, where the third preview interface corresponds to the first output mode. In this way, based on the different scenarios the user shoots, for example, when the user still takes pictures with the phone, the user moves from a bright light environment to a dark light environment. In this case, different output modes are adjusted according to different brightness, and the resolution and the sharpness of the image of the photo preview interface of the camera application under different lighting conditions is optimized.

According to the first aspect or any one of the above implementations in the first aspect, the method further includes: the second zoom ratio is greater than a preset switching ratio. In this way, when the preset zoom ratio is satisfied, different output modes are switched to improve the resolution and the sharpness of the image of the photo preview interface of the camera application.

According to the first aspect or any one of the above implementations in the first aspect, the method further includes: receiving a second operation performed by a user; and displaying a fourth preview interface of the camera application in response to the second operation, where the fourth preview interface includes a fourth preview image, the fourth preview image is obtained after processing a fourth image collected by the camera, the fourth preview image corresponds to a third zoom ratio, the fourth image corresponds to the first output mode of the camera, and the third zoom ratio is less than the preset switching ratio. In this way, when the user adjusts the zoom ratio to be less than the preset zoom ratio, different output modes are switched to improve the resolution and the sharpness of the image of the photo preview interface of the camera application.

According to the first aspect or any one of the above implementations in the first aspect, the second operation includes one of a gesture operation for zooming the first preview image, a screen tap operation, or dragging a zoom progress bar. In this way, based on habits of the user or different styles of the phones, the user can zoom the preview image in a plurality of manners to improve user experience.

According to the first aspect or any one of the above implementations in the first aspect, the method further includes: performing pixel cropping on the second image based on the second zoom ratio through digital zoom and electric image stabilization to obtain the second preview interface, where the second zoom ratio is greater than a preset image stabilization ratio. In this way, when the second zoom ratio satisfies the preset condition, after pixel cropping is performed on the image captured by the camera through the ISP and the EIS, the degree of shaking generated when the user shoots with the handheld phone is reduced, and user experience is improved.

According to the first aspect or any one of the above implementations in the first aspect, the digital zoom includes performing pixel cropping based on the second zoom ratio and the second output mode. In this way, combining the zoom ratio and the output mode for the pixel cropping can improve range and accuracy of the pixel cropping, reduce the degree of shaking generated when the user shoots with the handheld phone, and improve user experience.

According to the first aspect or any one of the above implementations in the first aspect, the electric image stabilization includes a 3D gyroscope, a 2D image feature point, and an image perspective transformation, and the 3D gyroscope is applicable to 3D image smoothing. In this way, by combining five-axis image stabilization integrating 2D and 3D techniques, the performance of the handheld phone photographing is improved, the degree of shaking generated by the handheld phone photographing of the user is reduced, and user experience is improved.

According to the first aspect or any one of the above implementations in the first aspect, the pixel cropping is performed based on the second zoom ratio through the 3D gyroscope and the 2D image feature point. In this way, when the user zooms the photo preview interface to the second zoom ratio, by combining five-axis image stabilization integrating 2D and 3D techniques, the performance of the handheld phone photographing is improved, the degree of shaking generated by the handheld phone photographing of the user is reduced, and user experience is improved.

According to the first aspect or any one of the above implementations in the first aspect, the image perspective transformation includes coordinate transformation. In this way, the range and the accuracy of the pixel cropping can be improved, the degree of shaking generated when the user shoots with the handheld phone is reduced, and user experience is improved.

According to the first aspect or any one of the above implementations in the first aspect, performing pixel cropping on the second image based on the second zoom ratio through digital zoom and electric image stabilization to obtain the second preview interface, where the second zoom ratio is greater than a preset image stabilization ratio. In this way, by combining five-axis image stabilization integrating 2D and 3D techniques, the performance of the handheld phone photographing is improved, the degree of shaking generated by the handheld phone photographing of the user is reduced, and user experience is improved.

According to a second aspect, an embodiment of this application provides an electronic device, where the electronic device includes a memory configured to store a computer program instruction and a processor configured to execute a program instruction, and when the computer program instruction is executed by the processor, the electronic device is triggered to execute the method according to any one of the first aspect.

The second aspect and any one of the implementations in the second aspect correspond to the first aspect and any one of the implementations in the first aspect respectively. Technical effects of the second aspect and any one of the implementations in the second aspect may be obtained with reference to the technical effects corresponding to the first aspect and any one of the implementations in the first aspect. Details are not described herein.

According to a third aspect, an embodiment of this application provides a computer-readable storage medium. The computer-readable storage medium stores a computer program. When the computer program runs on a computer, the computer is enabled to execute the method in any one of the first aspect.

The third aspect and any one of the implementations in the third aspect correspond to the first aspect and any one of the implementations in the first aspect respectively. Technical effects of the third aspect and any one of the implementations in the third aspect may be obtained with reference to the technical effects corresponding to the first aspect and any one of the implementations in the first aspect. Details are not described herein.

According to a fourth aspect, an embodiment of this application provides a computer program product. The computer program product includes a computer program. When the computer program runs on a computer, the computer is enabled to execute the method in any one of the first aspect.

The fourth aspect and any implementation of the fourth aspect are respectively corresponding to the first aspect and any implementation of the first aspect. For a technical effect corresponding to the fourth aspect and any implementation of the fourth aspect, refer to the technical effect corresponding to the first aspect and any implementation of the first aspect. Details are not described herein again.

In a possible design, the program in the fifth aspect may be stored in whole or in part on a storage medium packaged with a processor, or in part or in whole on a memory not packaged with a processor.

BRIEF DESCRIPTION OF DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

To better understand technical solutions of this application, the embodiments of this application are described in detail below with reference to accompanying drawings.

It should be noted that the described embodiments are merely some embodiments rather than all the embodiments of this application. All other embodiments obtained by a person of ordinary skill in the art based on the embodiments of this application without making creative efforts shall fall within the protection scope of this application.

In this specification and the appended claims of this application, the terms such as "first", "second", "third", and "fourth" are used only to distinguish descriptions, and should not be understood as indicating or implying relative importance.

Figure 1:
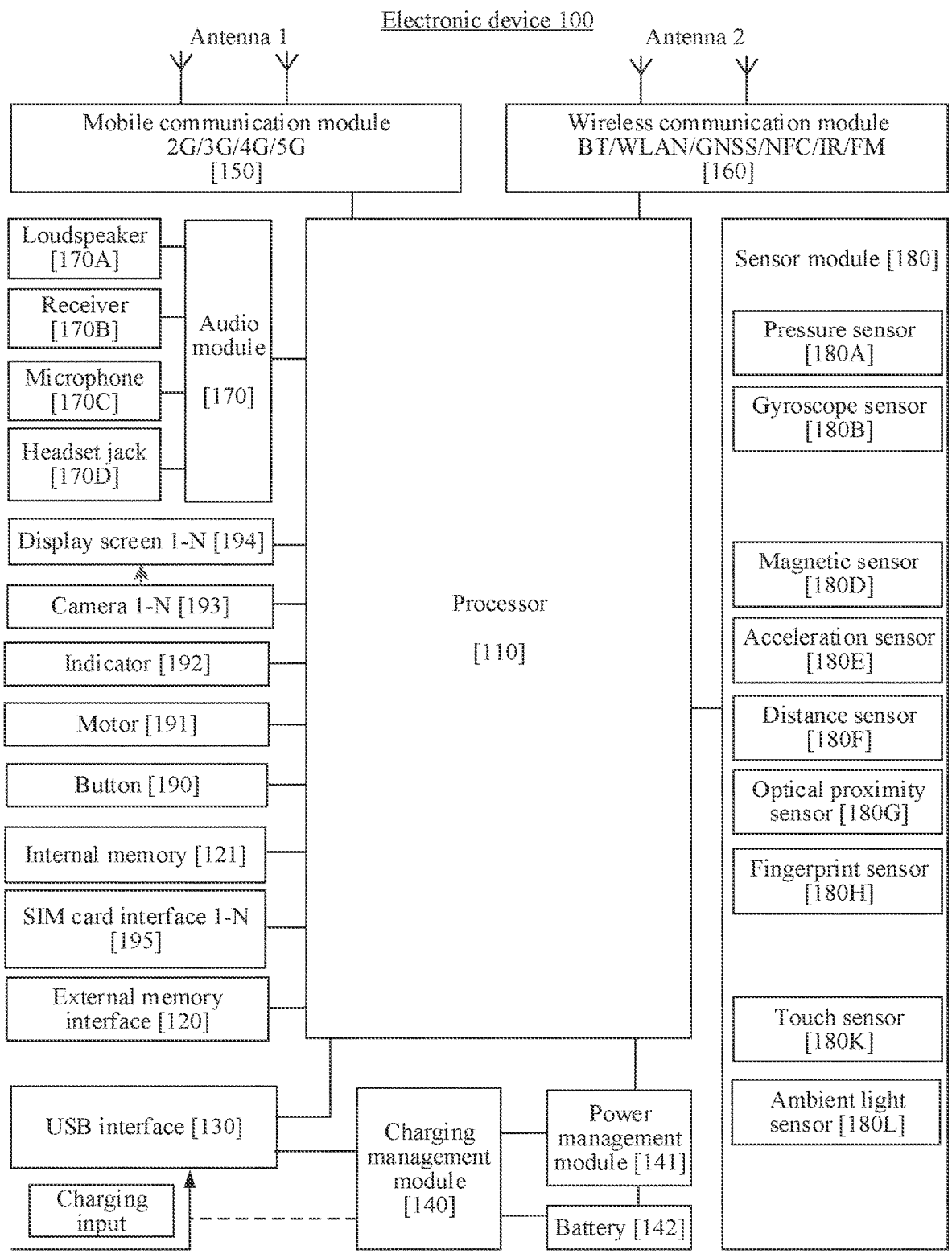
FIG. 1 is a schematic diagram of an electronic device according to an embodiment of this application.

FIG. 1 is a schematic diagram of a structure of an electronic device according to an embodiment of this application. The electronic device 100 may include a processor 110, an external memory interface 120, an internal memory 121, a universal serial bus (USB) interface 130, a charging management module 140, a power management unit 141, a battery 142, an antenna 1, an antenna 2, a mobile communication module 150, a wireless communication module 160, an audio module 170, a loudspeaker 170A, a receiver 170B, a microphone 170C, a headset jack 170D, a sensor module 180, a button 190, a motor 191, an indicator 192, a camera 193, a display screen 194, a subscriber identification module (SIM) card interface 195, and the like. The sensor module 180 may include a pressure sensor 180A, a gyro sensor 180B, a magnetic sensor 180D, an acceleration sensor 180E, a distance sensor 180F, a proximity light sensor 180G, a fingerprint sensor 180H, a touch sensor 180K, an ambient light sensor 180L, and the like.

It may be understood that the structure shown in the embodiment of this application does not constitute a specific limitation on the electronic device 100. In some other embodiments of this application, the electronic device 100 may include more or fewer components than those shown in the figure, or some components may be combined, or some components may be divided, or different component arrangements may be used. The components in the portrait may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU), or the like. Different processing units may be separate devices, or may be integrated into one or more processors. For example, the processor 110 is configured to perform the detection method of ambient light in the embodiment of this application.

The controller may be a nerve center and a command center of the electronic device 100. The controller may generate an operation control signal based on instruction operation code and a time-sequence signal, and control obtaining and executing of instructions.

A memory may also be arranged in the processor 110, and is configured to store instructions and data. In some embodiments, the memory in the processor 110 is a cache memory. The memory may store instructions or data recently used or cyclically used by the processor 110. If the processor 110 needs to use the instruction or the data again, the processor may directly invoke the instruction or the data from the memory, Therefore, repeated access is avoided, a waiting time of the processor 110 is shortened, and system efficiency is improved.

In some embodiments, the processor 110 may include one or more interfaces. The interface may include an integrated circuit (I2C) interface, an integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The external memory interface 120 can be configured to connect an external storage card such as a Micro SD card, to improve a storage capacity of the electronic device 100. The external storage card communicates with the processor 110 by using the external memory interface 120, to implement a data storage function, for example, to store files such as music and a video into the external storage card.

The internal memory 121 may be configured to store computer executable program code, where the executable program code includes instructions. The processor 110 runs the instructions stored in the internal memory 121, to implement various functional applications and data processing of the electronic device 100. The internal memory 121 may include a program storage area and a data storage area. The program storage area may store an operating system, an application program required by at least one function, and the like. The data storage region may store data created when the electronic device 100 is used.

In addition, the internal memory 121 may include a high-speed random access memory, and may further include a non-volatile memory, for example, at least one disk storage device, a flash memory device, or a universal flash storage (UFS).

The pressure sensor 180A is configured to sense a pressure signal, and can convert the pressure signal into an electrical signal. In some embodiments, the pressure sensor 180A may be arranged on the display screen 194. There are many types of pressure sensors 180A, such as a resistive pressure sensor, an inductive pressure sensor, and a capacitive pressure sensor. The capacitive pressure sensor may be a parallel plate including at least two conductive materials. In a case that a force is applied onto the pressure sensor 180A, a capacitance between electrodes changes. The electronic device 100 determines intensity of the pressure based on the change in capacitance. When a touch operation is performed on the display screen 194, the electronic device 100 detects strength of the touch operation by using the pressure sensor 180A. The electronic device 100 may also calculate a touch position based on a detection signal of the pressure sensor 180A.

In some embodiments, touch operations acting at the same touch position but with different touch operation intensities may correspond to different operation instructions. For example, when a touch operation whose touch operation strength is less than a first pressure threshold is performed on a short message application icon, an instruction of checking a short message is executed. When a touch operation with a touch operation intensity greater than or equal to the first pressure threshold acts on the short message application icon, an instruction of create a new short message is executed.

The gyroscope sensor 180B may be configured to determine a motion posture of the electronic device 100. In some embodiments, an angular velocity of the electronic device 100 around three axes (i.e., x, y, and z axes) may be determined through the gyroscope sensor 180B. The gyro sensor 180B may be configured to achieve image stabilization during photographing. For example, when the shutter is pressed, the gyroscope sensor 180B detects an angle at which the electronic device 100 jitters, and calculates, based on the angle, a distance for which a lens module needs to compensate, and allows the lens to cancel the jitter of the electronic device 100 through reverse motion, thereby implementing image stabilization. The gyro sensor 180B may also be configured for scenarios of navigation and motion sensing games.

The magnetic sensor 180D includes a Hall sensor. The electronic device 100 may detect an opening state or a closing state of a flip leather case by using the magnetic sensor 180D. In some embodiments, when the electronic device 100 is a clamshell phone, the electronic device 100 may detect opening and closing of a flip cover based on the magnetic sensor 180D. Further, features such as automatic unlocking of the flip cover are set based on the detected opening and closing states of the leather case or opening and closing states of the flip cover.

The acceleration sensor 180E may detect an acceleration value of the electronic device 100 all directions (generally in three axes). When the electronic device 100 is stationary, a magnitude and a direction of gravity may be detected. The acceleration sensor may be further configured to recognize a posture of the electronic device, and is applied to applications such as switching between landscape and portrait modes and a pedometer.

The distance sensor 180F is configured to measure a distance. The electronic device 100 may measure the distance by using infrared or laser. In some embodiments, in a photographing scenario, the electronic device 100 may measure a distance by using the distance sensor 180F, to implement quick focusing.

The optical proximity sensor 180G may include, for example, a light emitting diode (LED) and an optical detector, such as a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that a user holds the electronic device 100 close to an ear for a call, so as to implement automatic screen-off to save power. The optical proximity sensor 180G may be further configured to automatically unlock and lock the screen in a leather cover mode and a pocket mode.

The fingerprint sensor 180H is configured to collect a fingerprint. The electronic device 100 may implement fingerprint unlock, application lock accessing, fingerprint photographing, fingerprint-based call answering, and the like by using a feature of the collected fingerprint.

The touch sensor 180K is also referred to as a "touch panel". The touch sensor 180K may be arranged on the display screen 194. The touch sensor 180K and the display screen 194 form a touchscreen, and is also referred to as a "touch screen". The touch sensor 180K is configured to detect a touch operation on or near the touch sensor. The touch sensor may transfer the detected touch operation to the application processor to determine a type of a touch event. A visual output related to the touch operation may be provided by using the display screen 194. In some other embodiments, the touch sensor 180K may alternatively be arranged on the surface of the electronic device 100 at a position different from that of the display screen 194.

The ambient light sensor 180L is configured to perceive ambient light brightness. The electronic device 100 can adaptively adjust brightness of the display screen 194 based on the sensed brightness of the ambient light. The ambient light sensor 180L may also be configured to automatically adjust white balance during photographing. The ambient light sensor 180L may also cooperate with the optical proximity sensor 180G to detect whether the electronic device 100 is in a pocket to prevent a false touch.

The button 190 includes a power button, a volume button, and the like. The button 190 may be a mechanical button, or a touch-type button. The electronic device 100 may receive a button input, and generate a button signal input related to user setting and function control of the electronic device 100.

The motor 191 may generate a vibration prompt. The motor 191 may be configured to provide a vibration prompt for an incoming call, and may also be configured to provide vibration feedback for touch. For example, touch operations performed on different applications (for example, photo taking and audio playing) may correspond to different vibration feedback effects. The motor 191 may also correspond to different vibration feedback effects for touch operations applied to different areas of the display screen 194. Different application scenarios (for example, a time reminder, information receiving, an alarm clock, and a game) may further correspond to different vibration feedback effects. Customization of a touch vibration feedback effect may also be supported.

The indicator 192 may be an indicator light that may be configured to indicate a charging state and a power change, or may be configured to indicate a message, a missed call, a notification, and the like.

The electronic device 100 implements a display function by using the GPU, the display screen 194, the application processor, and the like. The GPU is an image processing microprocessor, and is connected to the display screen 194 and the application processor. The GPU is configured to perform mathematical and geometric calculations, and is configured to render graphics. The processor 110 may include one or more GPUs configured to execute program instructions to generate or change display information.

The display screen 194 is configured to display an image, a video, or the like. The display screen 194 includes a display panel. The display panel may be an organic light-emitting diode (OLED). In some embodiments, the electronic device 100 may include 1 or N display screens 194, where N is a positive integer greater than 1.

The electronic device 100 may implement a photographing function by using the ISP, the camera 193, the video codec, the GPU, the display screen 194, the application processor, and the like.

The camera 193 is configured to capture a still image or video. An object generates an optical image by using a lens and projects the optical image to a photosensitive element. The photosensitive element may be a charge-coupled device (CCD) or a complementary metal-oxide-semiconductor (CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into an image signal in a standard form, for example, RGB or YUV. In some embodiments, the electronic device 100 may include 1 or N cameras 193, where N is a positive integer greater than 1.

The video codec is configured to: compress or decompress a digital video. The electronic device 100 may support one or more video codecs. In this way, the electronic device 100 may play or record videos in a plurality of encoding formats, for example, moving picture experts group (MPEG) 1, MPEG 2, MPEG 3, and MPEG 4.

Figure 2:
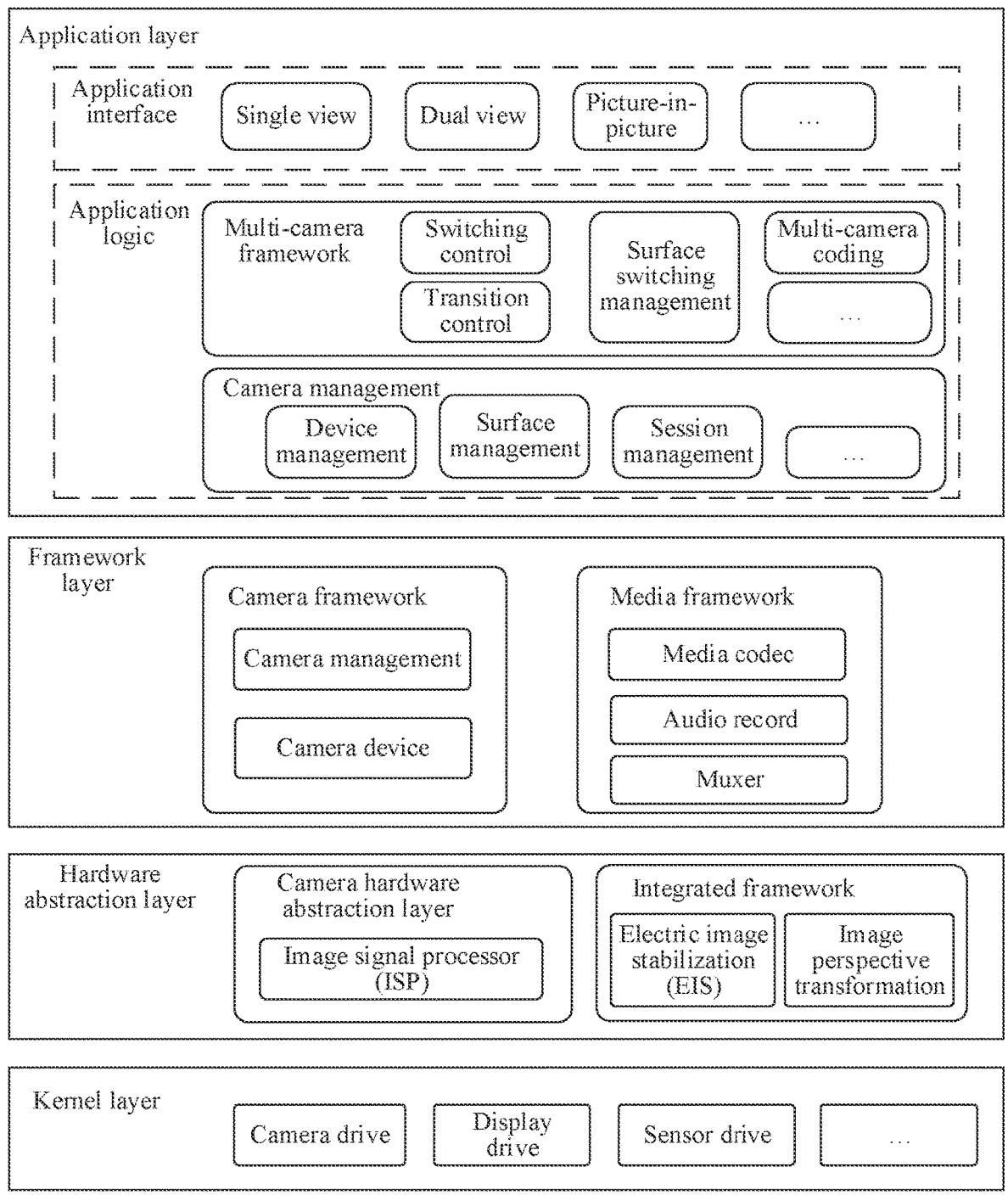
FIG. 2 is a block diagram of a software structure of an electronic device according to an embodiment of this application.

FIG. 2 is a block diagram of a software structure of an electronic device according to an embodiment of this application. In the hierarchical architecture, software is divided into several layers, and each layer has a clear role and task. The layers communicate with each other through a software interface. In some embodiments, the Android system is divided into four layers: an application layer, a framework layer, a hardware abstraction layer, and a hardware layer from top to bottom.

The application layer (Application, App) may include a series of application packages. For example, the application packages may include a camera application. The application layer may be further divided into an user interface (UI) and application logic.

The application interface of the camera application includes a single-view mode, a dual-view mode, a picture-in-picture mode, and the like, which correspond to different image or video photographing modes.

The application logic of the camera application includes a multi-camera framework and camera management. The multi-camera framework includes a switching control module, a surface switching management module, a multi-camera coding module, a transition control module, and the like. The switching control module is configured to control a switching of the photographing mode, such as a switching between a front-camera mode, a rear-camera mode, a front-rear mode, a rear-rear mode, and a picture-in-picture mode. The process of switching the photographing mode may involve opening or closing a specific camera, shielding a hardware difference between different chip platforms, and so on. The surface switching management module is configured to control Surface switching during switching of the photographing mode. In the Android system, Surface corresponds to a screen buffer and is used to store pixel data of a current window. Specifically, in the process of image or video photographing, there is a preview Surface and a coded Surface. The surface switching management module is configured to control the switching between the preview Surface and the coding Surface during the switching of the photographing mode. The multi-camera coding module is configured to code during the photographing mode to generate an image or video file, that is, to realize recording of the captured image or video. The transition control module is configured to generate a transition dynamic effect in the process of photographing mode switching. The camera management includes a device management module, a Surface management module, a session management module, and the like.

The framework (FWK) provides an application programming interface (API) and a programming framework for an application at the application layer. The application framework layer includes some predefined functions. In FIG. 2, the framework includes a camera framework and a media framework. The camera framework may be a camera2 API (Camera2 API), which is an Android-launched set of interfaces for accessing a camera device, and uses a pipelined design to make data flow from the camera to the Surface. The Camera2 API includes a camera manager (CameraManager) and a camera device (CameraDevice). The CameraManager is a management class of the Camera device, through which Camera device information of the device can be queried to obtain a CameraDevice object. The CameraDevice provides a series of fixed parameters associated with the Camera device, such as basic settings and an output format.

The media framework includes a media codec (MediaCodec), an audio record (AudioRecord), and a muxer (Muxer). The mediaCodec is a class provided by Android for coding and decoding the audio and the video. The mediaCodec realizes a function of codec by accessing an underlying codec and is part of a basic framework of the Android media. A main function of the AudioRecord is to enable various applications to manage an audio resource, so that the AudioRecord can record sounds collected by the hardware. The muxer is configured to combine video compressed data (such as H.264) and audio compressed data (such as AAC) into one encapsulated format data.

The hardware abstraction layer (HAL) is an interface layer located between an operating system kernel and a hardware circuit, to abstract hardware. The hardware abstraction layer hides hardware interface details of a specific platform, and provides an operating system with a virtual hardware platform, making the operating system hardware-independent and portable on a plurality of platforms. In FIG. 2, the HAL includes a camera hardware abstraction layer (Camera HAL), and the Camera HAL includes an image signal processor (ISP), and the like. The HAL further includes an integrated framework. The integrated framework includes electric image stabilization (EIS), image perspective transformation, and the like. It can be understood that the image signal processor, the electric image stabilization, and the image perspective transformation are abstract devices. In an image or video photographing scenario, the HAL creates a data stream of the corresponding size according to the resolution issued by an upper layer and a magnitude of the Surface.

The kernel (Kernel) layer is a layer between hardware and software. The kernel layer includes at least a display drive, a camera drive, a sensor drive, and the like.

Figure 3:
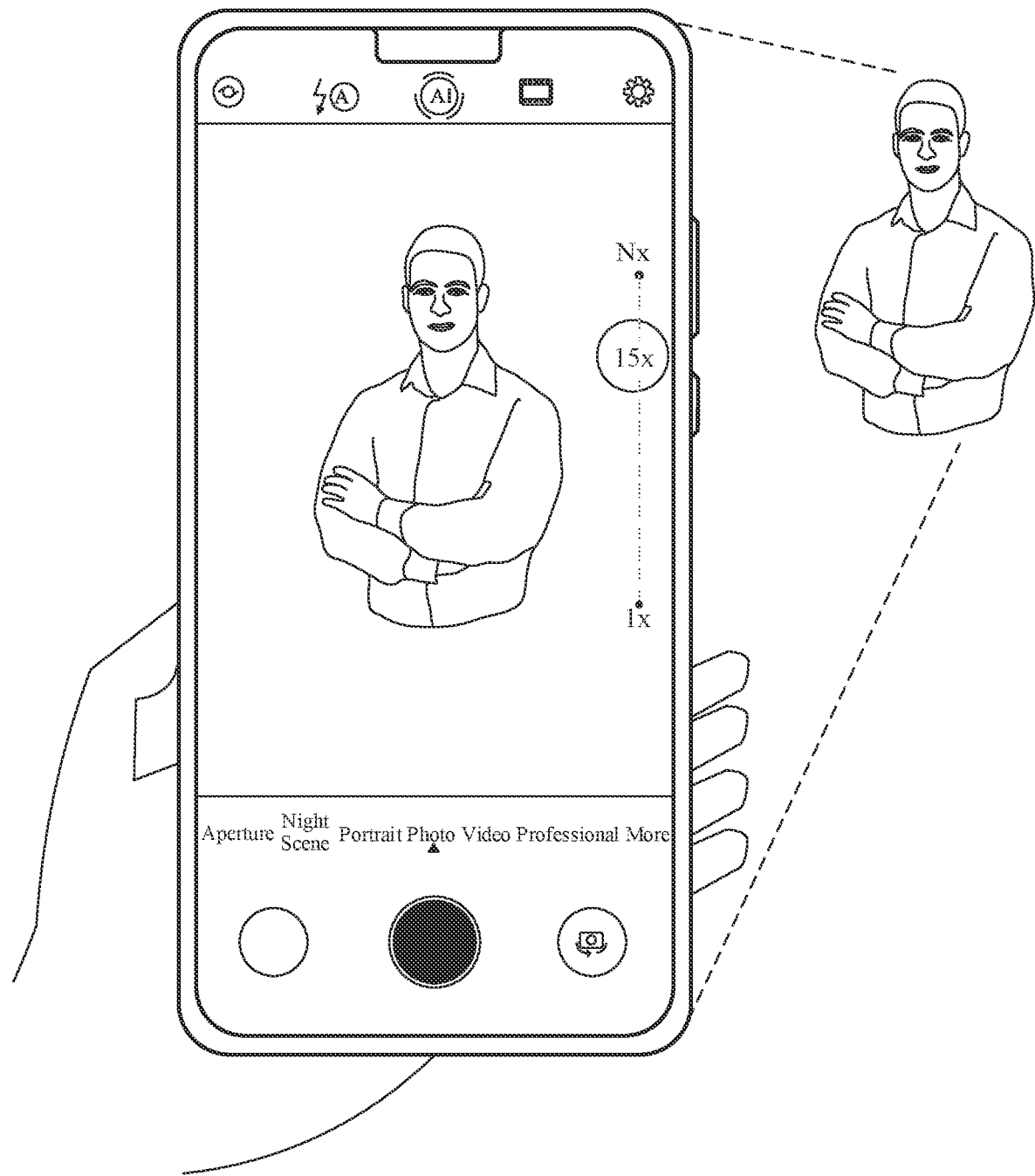
FIG. 3 is a schematic diagram of a photo preview scenario of a camera application according to an embodiment of this application.

Referring to FIG. 3, an embodiment of this application provides an image photographing method. This method can be applied to a scenario where a photo preview interface of a phone camera application is not clearly imaged due to hand shake during an image scaling process when a user holds the phone and opening the phone camera application to take a picture. As an example, the user holds the phone with one or both hands and opens the phone camera application. In a photographing scenario that requires image zoom, an image zoom (Zoom) function of the phone is turned on to zoom in on the image. Due to an inevitable shaking of the hand or the body, the picture presented on the preview interface of the phone becomes blurred due to shaking.

It may be understood that a form of the electronic device is only exemplified by the phone, and the electronic device may also be a handheld electronic device with a camera function such as a tablet computer or a handheld computer, which is not limited here.

In daily life, taking pictures is one of the most frequently used scenarios of the phone. It can be seen everywhere that people pick up their phones and use their phone cameras to capture moments in life. Image stabilization is an important factor affecting an image quality. Image shake inevitably leads to a blurred and low-definition image.

Therefore, a plurality of smart phones having shooting functions add a stabilization technology when taking pictures, which can reduce and avoid the blurring of the picture caused by a factor such as the hand shaking during taking pictures, thereby improving the clarity of the image.

For example, optical image stabilization (OIS) is a physical image stabilization technology realized by a special motor structure of a camera lens. The gyro is configured to calculate the shaking of the phone in the photographing process, and a signal is transmitted to the microprocessor. After calculating a displacement amount to be compensated, a lens movement is controlled to perform optical compensation to achieve the image stabilization. However, the OIS is limited to shake in a small amplitude range, and it is difficult to compensate for large angle shake.

In an implementation of this application, after the image is zoomed, in order to improve the clarity of the image presented on the phone photo preview interface when taking pictures, an output mode of the image can be determined according to a photographing brightness. The photographing brightness refers to the brightness of the environment in which the camera of the phone takes the image. A brighter photographing environment leads to more light rays obtained by the image captured by the mobile phone. Conversely, a darker photographing environment leads to fewer light rays obtained by the image captured by the mobile phone.

Optionally, a current ambient light brightness is detected based on the ambient light sensor in a phone hardware module to determine the brightness of the image currently displayed in a camera photo preview interface.

Optionally, the image brightness currently displayed on the camera photo preview interface is determined based on average brightness information of the image in the current camera photo preview interface, including a color of the image, a pixel value of each pixel in the image, and the like.

It should be noted that the brightness detection and determining of the camera photo preview interface include but are not limited to the situations listed above. In actual use, another manner may be used for obtaining the image brightness of the current camera photo preview interface based on an actual need.

Figure 4:
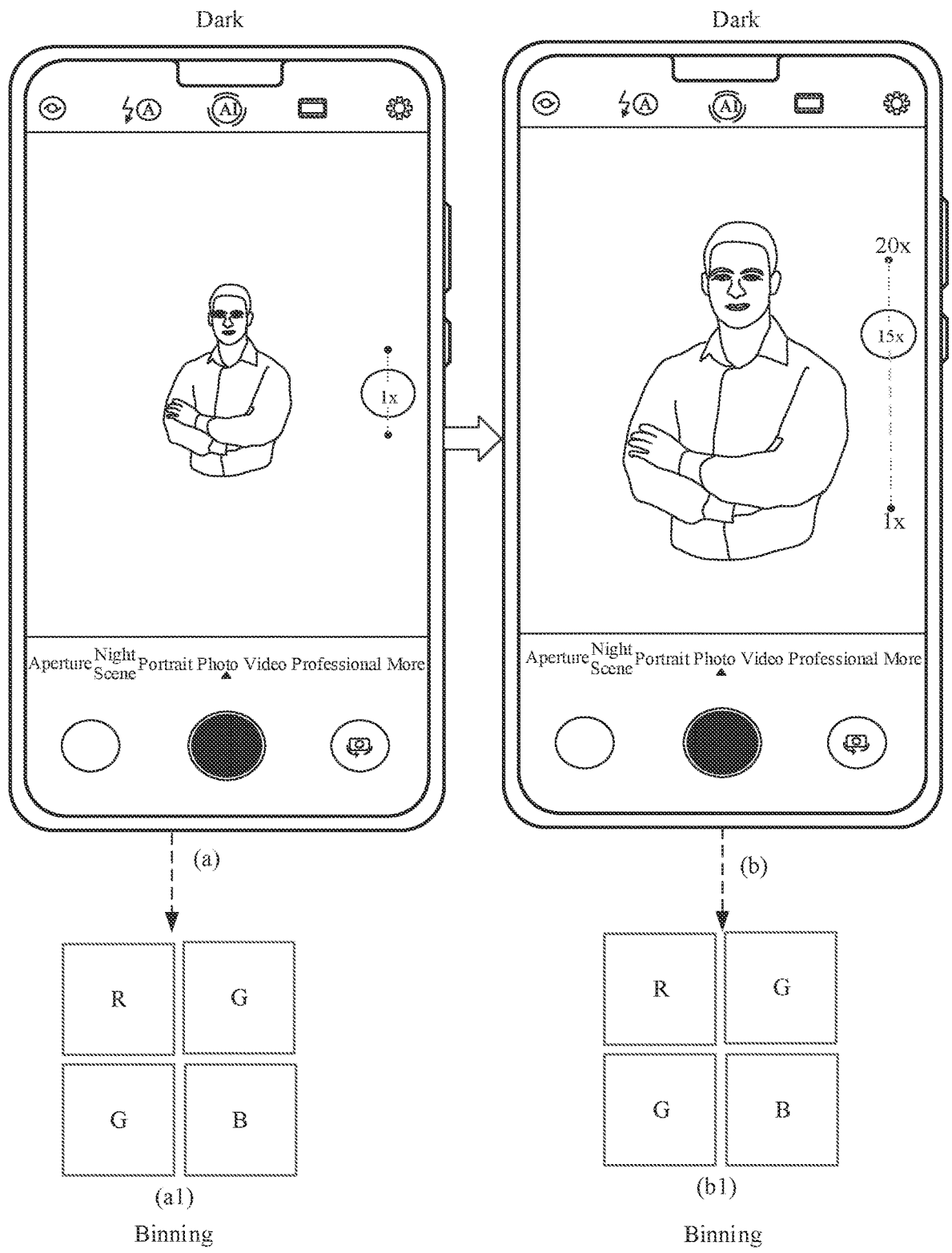
FIG. 4 is a schematic diagram of photographing and imaging under a dark light condition according to an embodiment of this application.

After determining the current photographing brightness, the phone selects the corresponding photographing mode to output the picture to optimize the clarity under different photographing brightness. FIG. 4 is an imaging example in which a phone is detected to take a picture under a dark light condition. (a) in FIG. 4 represents an initial interface when the user picks up the phone and opens the camera application. The initial interface refers to the initial interface when the user opens the camera application. For example, the first preview interface is the initial interface, a first zoom ratio is an initial zoom ratio, and the initial zoom ratio is 1×. In this case, the photographing brightness is dark light. As shown in (b) in FIG. 4, in a scenario where the image zoom is required, the user performs a first operation. For example, the first operation includes one of a gesture operation for zooming the first preview image, a screen tap operation, or dragging a zoom progress bar. For example, the user touches the screen to zoom the picture to the required ratio, that is, the second zoom ratio, in a form of gesture control or clicking the image zoom switch of the photo preview interface. In this case, the camera application displays a second preview interface. For example, the maximum ratio supported by the phone is 20× by default. In this case, the user magnifies the image of the photo preview interface by 15×, that is, the image ratio of (b) in FIG. 4 is 15× that of (a) in FIG. 4.

For example, under the initial interface shown in (a) in FIG. 4, the camera application is in the photo preview interface, the camera captures a first image, and the phone sets the initial interface of the camera application to output the picture in Binning mode, that is, the picture output mode of (a1) in FIG. 4 is Binning, that is, the first output mode. And because it is a dark light condition in this case, after the imaging picture of the photo preview interface of the phone is enlarged by 15× to the state of (b) in FIG. 4, the camera captures a second image, and the phone still outputs pictures in Binning mode to ensure the clarity of the image displayed on the phone screen, that is, the picture output mode of (b1) in FIG. 4 is still Binning, that is, the second output mode.

For example, the first output mode is one of Binning, Remosaic, Quadra, Quadra HDR, or Stagger HDR.

For example, the second output mode is one of Binning, Remosaic, Quadra, Quadra HDR, or Stagger HDR.

Binning mode: During the process of capturing an image by the electronic device, light reflected by a target object is collected by the camera, so that the reflected light is transmitted to an image sensor. The image sensor includes a plurality of photosensitive elements, and charge collected by each photosensitive element is one pixel, and an analog binding (Binning) operation is performed on pixel information. Specifically, the Binning can combine n×n pixels into one pixel. For example, the Binning may combine 2×2 adjacent pixels into one pixel. To be specific, colors of the 2×2 adjacent pixels are presented in a form of one pixel.

For example, the second operation of the user is received, and a fourth preview interface of the camera application is displayed. The second operation includes one of a gesture operation for zooming the first preview image, a screen tap operation, or dragging a zoom progress bar. The fourth preview interface includes a fourth preview image, the fourth preview image is obtained after processing a fourth image collected by the camera, and the fourth preview image corresponds to a third zoom ratio. For example, the user reduces the picture to the required ratio in the form of gesture control or clicking the image zoom switch of the photo preview interface through the touch screen in the second preview interface in (b) in FIG. 4, that is, the third zoom ratio. When the third zoom ratio is less than a preset condition, that is, when the third zoom ratio is less than a preset switching ratio, for example, when the third zoom ratio is reduced to 1×, the image displays the fourth preview interface in this case, the camera collects a third image, and the output mode is Binning, that is, the first output mode.

Figure 5:
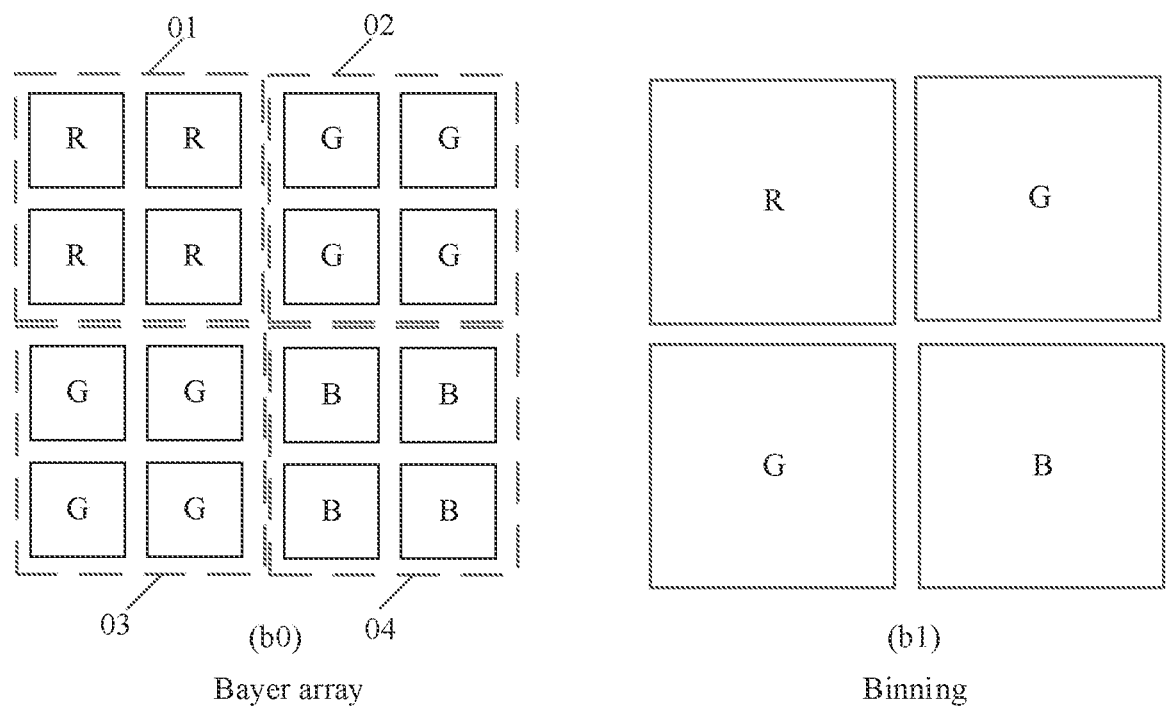
FIG. 5 is a schematic diagram of outputting an image in a Binning manner according to an embodiment of this application.

For example, FIG. 5 is a schematic diagram of the process of outputting the image in the Binning manner after the phone obtains the image. (b0) in FIG. 5 is a schematic diagram of a 4×4 pixel, combining adjacent 2×2 pixels into one pixel. (b1) in FIG. 5 is a schematic diagram of the pixel outputted in the Binning mode. For example, using the Binning mode, 2×2 pixels in a 01 area of (b0) in FIG. 5 are formed into a pixel R in (b1) in FIG. 5; 2×2 pixels in a 02 area of (b0) in FIG. 5 are formed into a pixel G in (b1) in FIG. 5; 2×2 pixels in a 03 area of (b0) in FIG. 5 are formed into the pixel G in (b1) in FIG. 5; and 2×2 pixels in a 04 area of (b0) in FIG. 5 are formed into a pixel B in (b1) in FIG. 5.

Taking an output image format as a Bayer array format image as an example, the Bayer format image refers to an image that only includes red, blue, and green (that is, three primary colors) in the image. For example, the pixel A formed by 2×2 pixels in the 01 area is red, the pixel B formed by 2×2 pixels in the 02 area is green, the pixel C formed by 2×2 pixels in the 03 area is green, and the pixel D formed by 2×2 pixels in the 04 area is blue.

Figure 6:
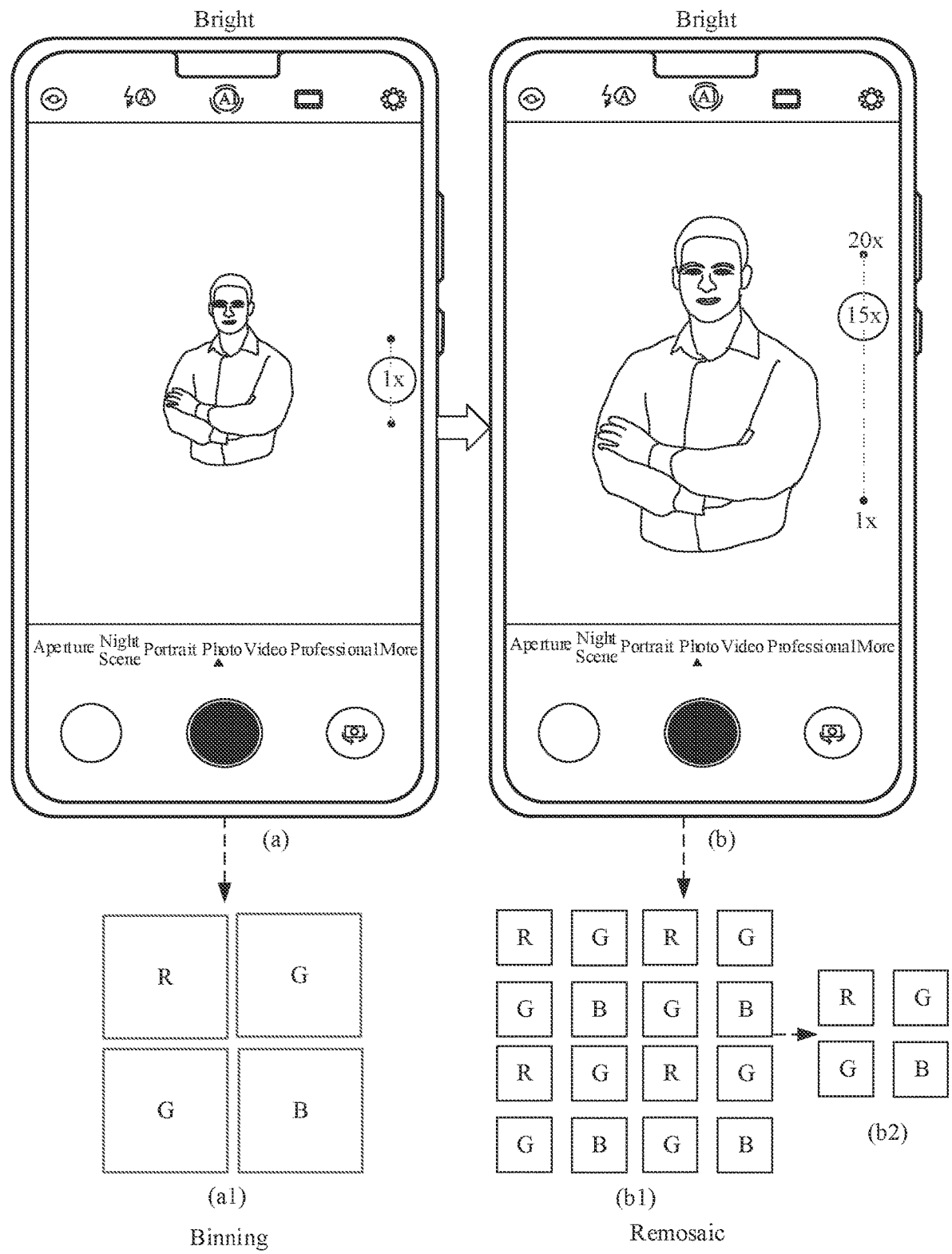
FIG. 6 is a schematic diagram of photographing and imaging under a bright light condition according to an embodiment of this application.

FIG. 6 is an imaging example in which a phone is detected to take a picture under a bright light condition. (a) in FIG. 6 represents an initial interface when the user picks up the phone and opens the camera application, that is, the first preview interface. In this case, the photographing brightness is bright. The initial zoom ratio is 1×, that is, the first zoom ratio. As shown in (b) in FIG. 6, in a scenario where the image zoom is required, the user performs a first operation. For example, the first operation includes one of a gesture operation for zooming the first preview image, a screen tap operation, or dragging a zoom progress bar. The user touches the screen to zoom the picture to the required ratio, that is, the second zoom ratio, in a form of gesture control or clicking the image zoom switch of the photo preview interface. In this case, the camera application displays a second preview interface. For example, the maximum ratio supported by the phone is 20× by default. In this case, the user magnifies the image of the photo preview interface by 15×, that is, the image ratio of (b) in FIG. 6 is 15× that of (a) in FIG. 6.

For example, under the initial interface shown in (a) in FIG. 6, the phone sets the initial interface of the camera application to output the picture in Binning mode, that is, the picture output mode of (a1) in FIG. 6 is Binning, that is, the first output mode. Besides, since it is the bright light condition in this case, the camera collects the second image. After the imaging picture of the photo preview interface of the phone is enlarged by 15× to the state of (b) in FIG. 6, that is, the second preview interface, the phone switches to the Remosaic mode to output the picture, that is, the second output mode, to ensure the clarity of the image displayed on the phone screen. That is to say, the picture output mode of (b1) in FIG. 6 is the Remosaic, and after further cropping, for example, one-half of a size of a side length, that is, the (b2) state in FIG. 6, the image is outputted.

For example, the second operation of the user is received, and a fourth preview interface of the camera application is displayed. The second operation includes one of a gesture operation for zooming the first preview image, a screen tap operation, or dragging a zoom progress bar. The fourth preview interface includes a fourth preview image, the fourth preview image is obtained after processing a fourth image collected by the camera, and the fourth preview image corresponds to a third zoom ratio. For example, the user reduces the picture to the required ratio in the form of gesture control or clicking the image zoom switch of the photo preview interface through the touch screen in the second preview interface in (b) in FIG. 6, that is, the third zoom ratio. When the third zoom ratio is less than a preset condition, that is, when the third zoom ratio is less than a preset switching ratio, for example, when the third zoom ratio is reduced to 1×, the image displays the fourth preview interface in this case, the camera collects a third image, and the output mode is Binning, that is, the first output mode.

Figure 7:
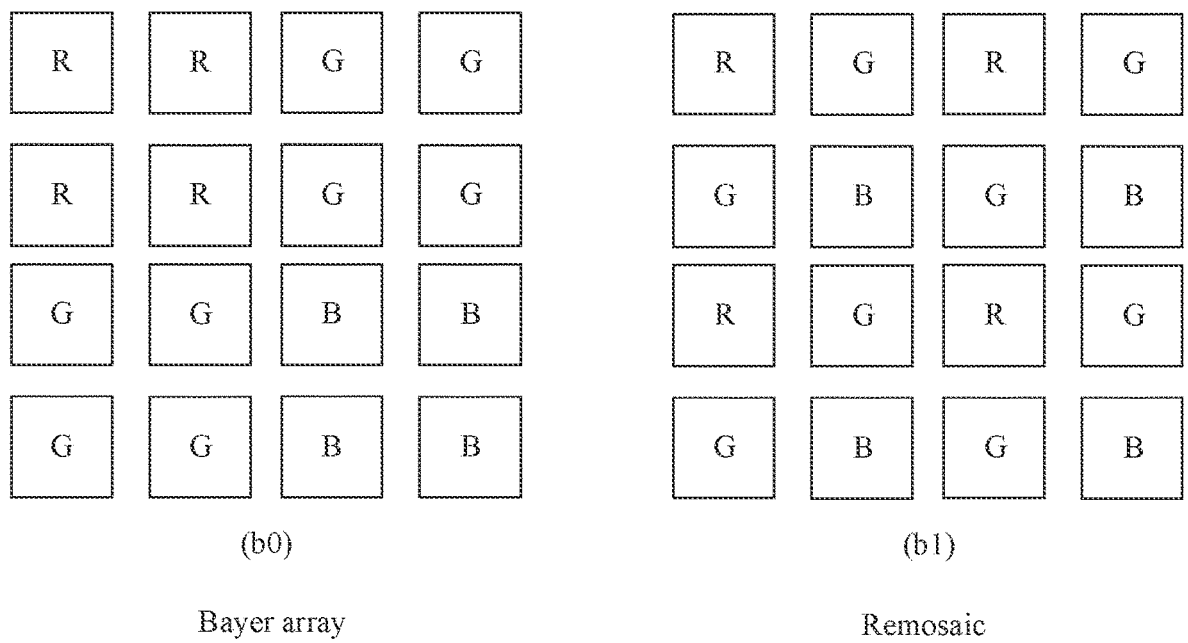
FIG. 7 is a schematic diagram of outputting an image in a Remosaic manner according to an embodiment of this application.

Remosaic mode: When the image is outputted in Remosaic mode, the Bayer format image is rearranged to obtain the Remosaic mode image. For example, if a pixel in an image is composed of n×n pixels, a pixel in the image can be rearranged by n×n pixels by using the Remosaic. For example, (b0) in FIG. 7 is a schematic diagram of a pixel, and each pixel is synthesized from adjacent 2×2 pixels. For example, (b1) in FIG. 7 is a schematic diagram of an image in the Bayer format outputted by using the Remosaic. Specifically, the pixels in (b0) in FIG. 7 are red, green, and blue. Each pixel in (b0) in FIG. 7 is divided into 2×2 pixels and rearranged separately. That is, the Remosaic mode is used for outputting, and the outputted image is the Bayer format image shown in (b1) in FIG. 7.

Figure 8:
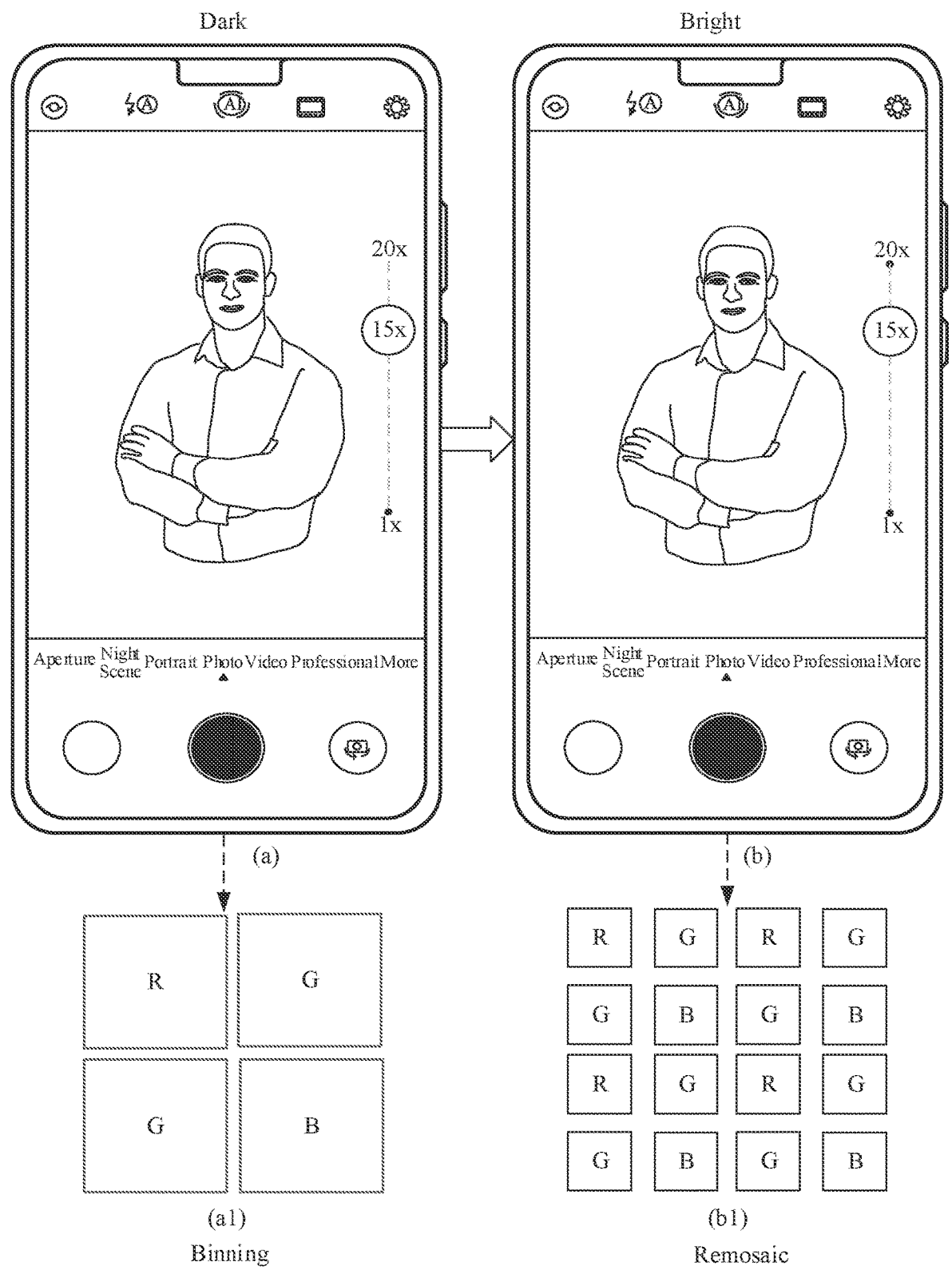
FIG. 8 is a schematic diagram of images obtained before and after switching of the photographing brightness from dark to bright according to an embodiment of this application.

For example, as shown in FIG. 8, FIG. 8 is an example of image output when the photographing brightness changes from dark to bright after the image zoomed by a ratio. Specifically, when the image is enlarged to, for example, 15×, that is, from the first zoom ratio to the second zoom ratio, that is, the state of (a) in FIG. 8, since the brightness is determined to be in a dark light state in this case, the picture output mode is the Binning mode, that is, the mode of (a1) in FIG. 8, that is, the second output mode. Due to the movement of the user when holding the phone for photographing, that is, moving from a dark light environment to a bright light environment, the photographing brightness of the phone changes. In this case, when the phone detects that the brightness is bright, the camera application displays the third preview interface, that is, the state of (b) in FIG. 8, and switches the picture output mode to the Remosaic mode, that is, the mode of (b1) in FIG. 8, that is, the first output mode.

Figure 9:
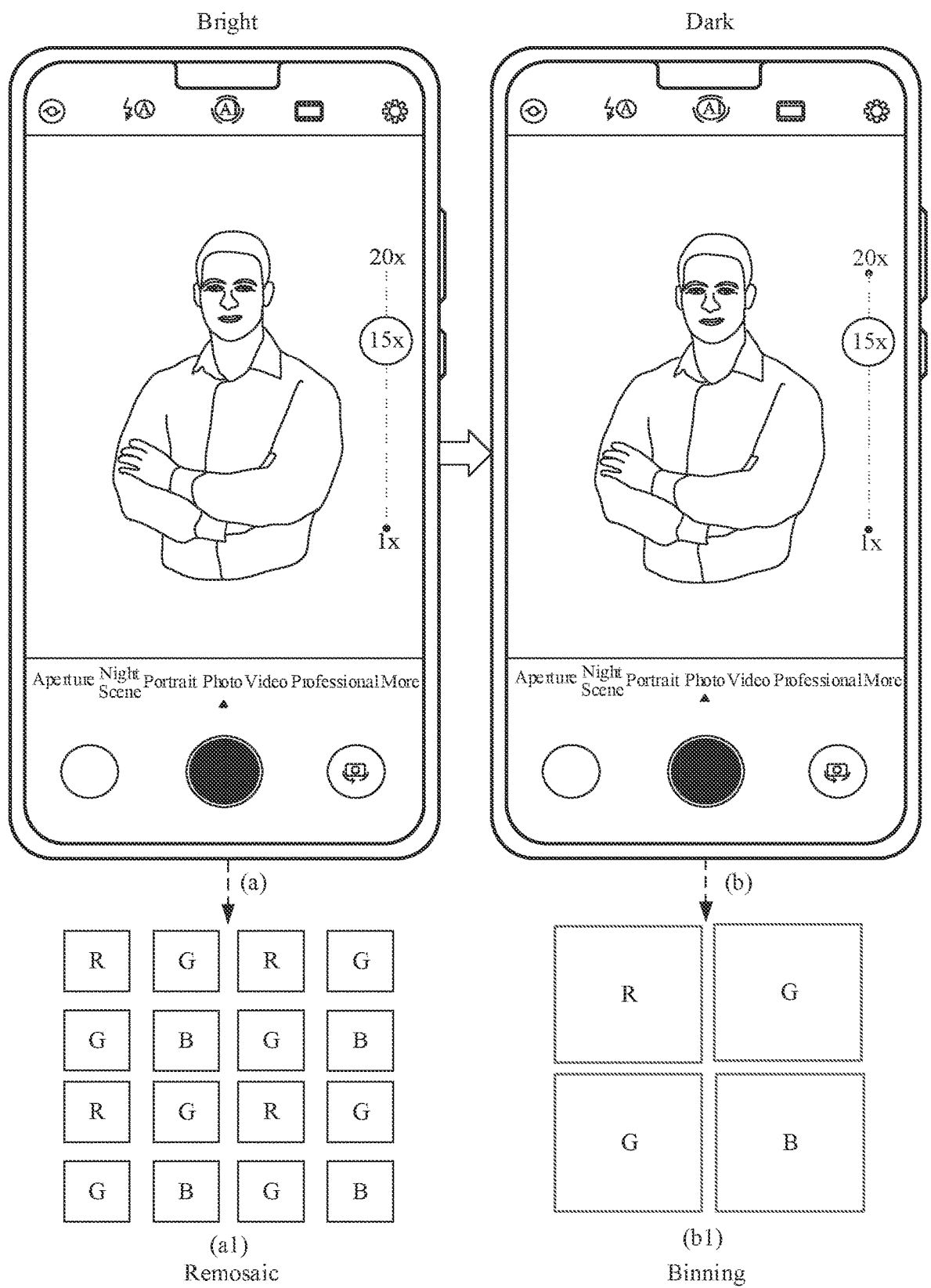
FIG. 9 is a schematic diagram of images obtained before and after switching of the photographing brightness from bright to dark according to an embodiment of this application.

For example, as shown in FIG. 9, FIG. 9 is an example of image output when the photographing brightness changes from bright to dark after the image zoomed by a ratio. Specifically, when the image is enlarged to, for example, 15×, that is, from the first zoom ratio to the second zoom ratio, that is, the state of (a) in FIG. 9. Since the brightness is determined to be in a bright state in this case, the picture output mode is the Remosaic mode, that is, the mode of (a1) in FIG. 9, that is, the second output mode. Due to the movement of the user when holding the phone for photographing, that is, moving from the bright light environment to the dark light environment, the photographing brightness of the phone changes. In this case, when the phone detects that the brightness is dark, the camera application displays the third preview interface, that is, the state of (b) in FIG. 9, and switches the picture output mode to the Binning mode, that is, the mode of (b1) in FIG. 9, that is, the first output mode.

For example, in an indoor photographing scenario at night, when the indoor lighting is bright, the phone shoots the photographing scenario and switches to the Remosaic mode to output the picture. However, in this case, when the phone needs to shoot a dark scenario outside a window from a bright interior, since it is detected that the brightness outside the window is dark, although the indoor light is bright, when the phone shoots a mirror image outside the window, it still needs to switch to the Binning mode to ensure the clarity of the image imaging.

Figure 10:
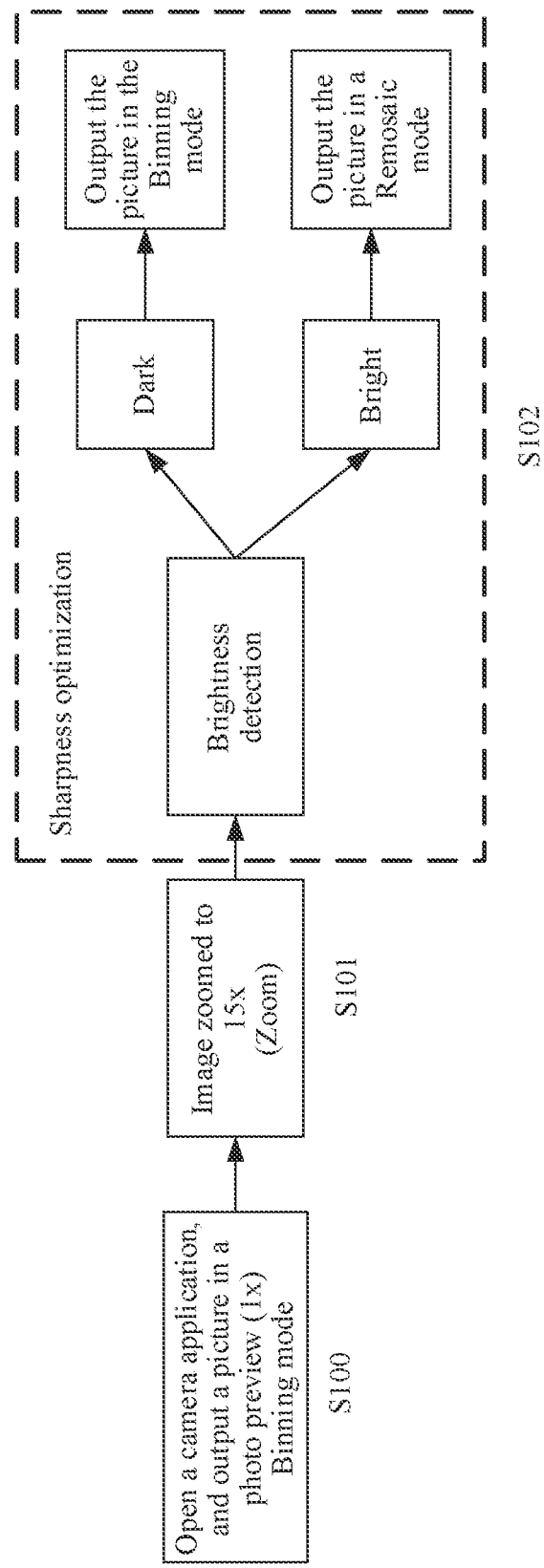
FIG. 10 is a schematic diagram of switching an image output mode according to an embodiment of this application.

FIG. 10 is a logical example in which the phone selects the corresponding image sensor configuration based on the brightness and outputs the image. Specifically, the method includes the following steps.

S100: The user opens a phone camera application. In this case, the camera application displays an initial photo preview interface. A default initial interface is a state in which the image is zoomed 1× (that is 1×), and a default initial image output mode is the Binning mode.

S101: The user operates the photo preview interface to zoom in or out of a screen image in a live preview. It may be understood that the image zoom of the user includes a gesture operation on a touch screen and clicking on an image zoom button on the phone screen.

For example, the embodiment of this application is described by using the user magnifies the displayed image on the photo preview interface of the camera application to 15× in real time as an example.

When the image is zoomed by a ratio, especially when the image is enlarged 15×, the hand shake caused by the handheld phone is 15 times of that in the default state in which the image is zoomed 1×, so that the image is more shaken and becomes blurred and unclear. Therefore, the scaled image can be optimized for sharpness.

S102: after the user zooms the real-time image of the photo preview interface, the phone optimizes the clarity of the picture displayed on the mobile phone screen.

Specifically, after the phone detects that the image in S101 is scaled to a preset switching ratio, the photographing brightness is detected.

Optionally, a current ambient light brightness is detected based on the ambient light sensor in a phone hardware module to determine the brightness of the image currently displayed in a camera photo preview interface.

Optionally, the image brightness currently displayed on the camera photo preview interface is determined based on average brightness information of the image in the current camera photo preview interface, including a color of the image, a pixel value of each pixel in the image, and the like.

It should be noted that the brightness detection and determining of the camera photo preview interface include but are not limited to the situations listed above. In actual use, another manner may be used for obtaining the image brightness of the current camera photo preview interface based on an actual need.

When it is detected that the current photographing brightness is dark, the image output mode is set to the Binning mode to output the picture.

When it is detected that the current photographing brightness is bright, the image output mode is set to the Remosaic mode to output the picture.

It should be noted that in the embodiment of this application, S102 is triggered only when image of the S101 is scaled to be greater than the preset switching ratio. When the zoom ratio is less than the preset switching ratio, the mode of outputting the image of S102 outputs the picture in Binning mode. Optionally, the preset switching ratio is 6× to 10×. For example, 8× is used as the preset switching ratio.

In an example, under the dark light condition when the image is zoomed to 15×, the image pixel is outputted as 4608*3456 by the 16M Binning mode. Under the bright light condition when the image is zoomed to 15×, the image pixel is outputted as 9216*6912 by the 64M Remosaic mode, and on this basis, the image sensor further cuts one-half to the image pixel outputted as 4608*3456, so that the output pixels under the dark light condition and the bright light condition are the same. In this way, additional power consumption in a subsequent step such as S103 when the ISP continues to crop the image can be saved.

After completing the above steps, that is, after the sharpness optimization of the output image of the photo preview interface of the camera application is completed, the phone continues to optimize the image shake presented on the phone screen.

Figure 11:
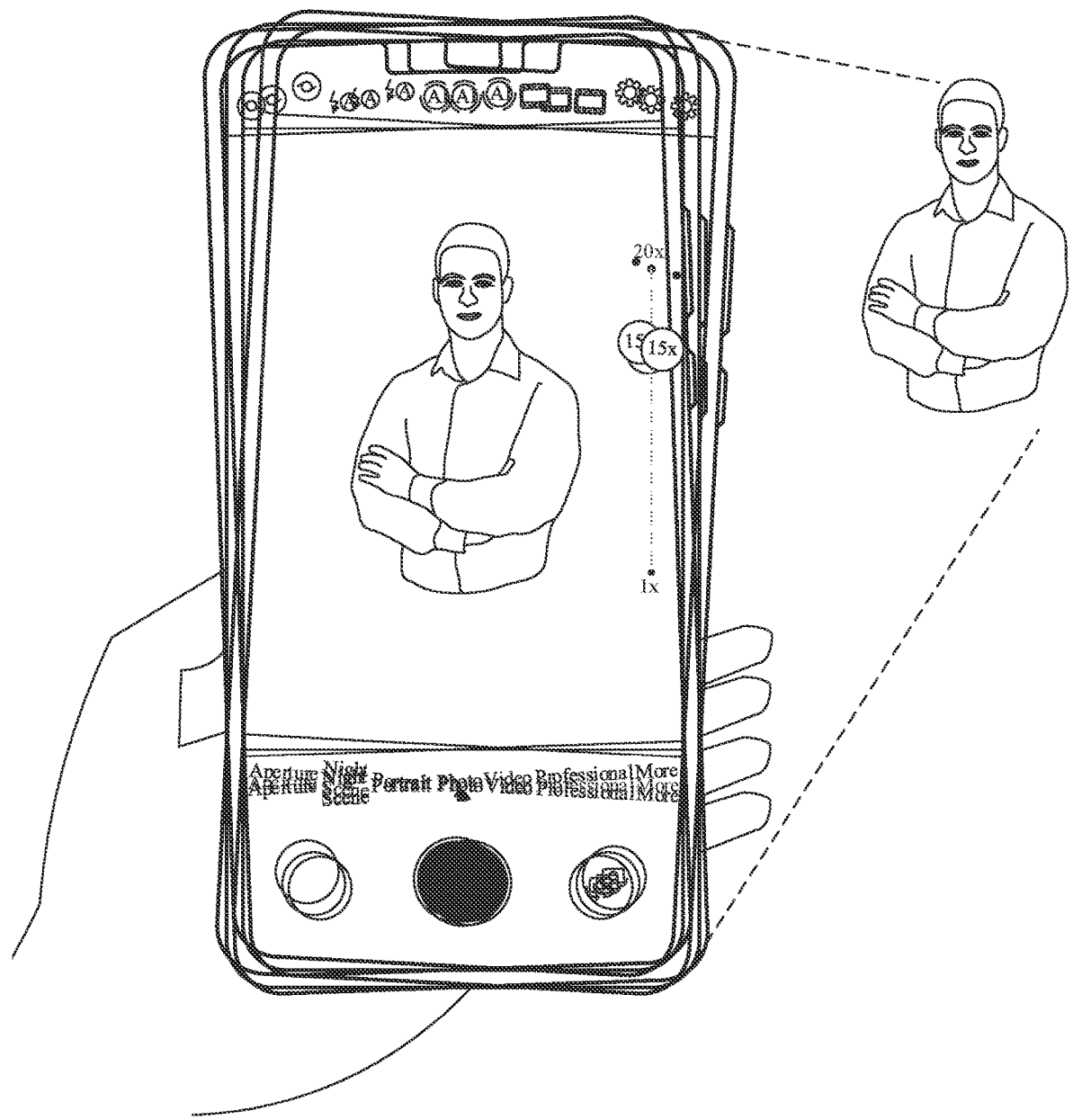
FIG. 11 is an example of an implementation of image stabilization according to an embodiment of this application.

FIG. 11 is an example of an implementation of image stabilization according to an embodiment of this application. In a scenario shot by the user holding the phone, the camera application is set by the user to zoom in 15× to display people from a distance. In this case, although the user has obvious hand shake and the image screen becomes blurred, after the image processing method disclosed in this application, the image of the photo preview interface presented by the camera application of the mobile phone is still stable, thereby improving photographing experience of the user.

Figure 12A:
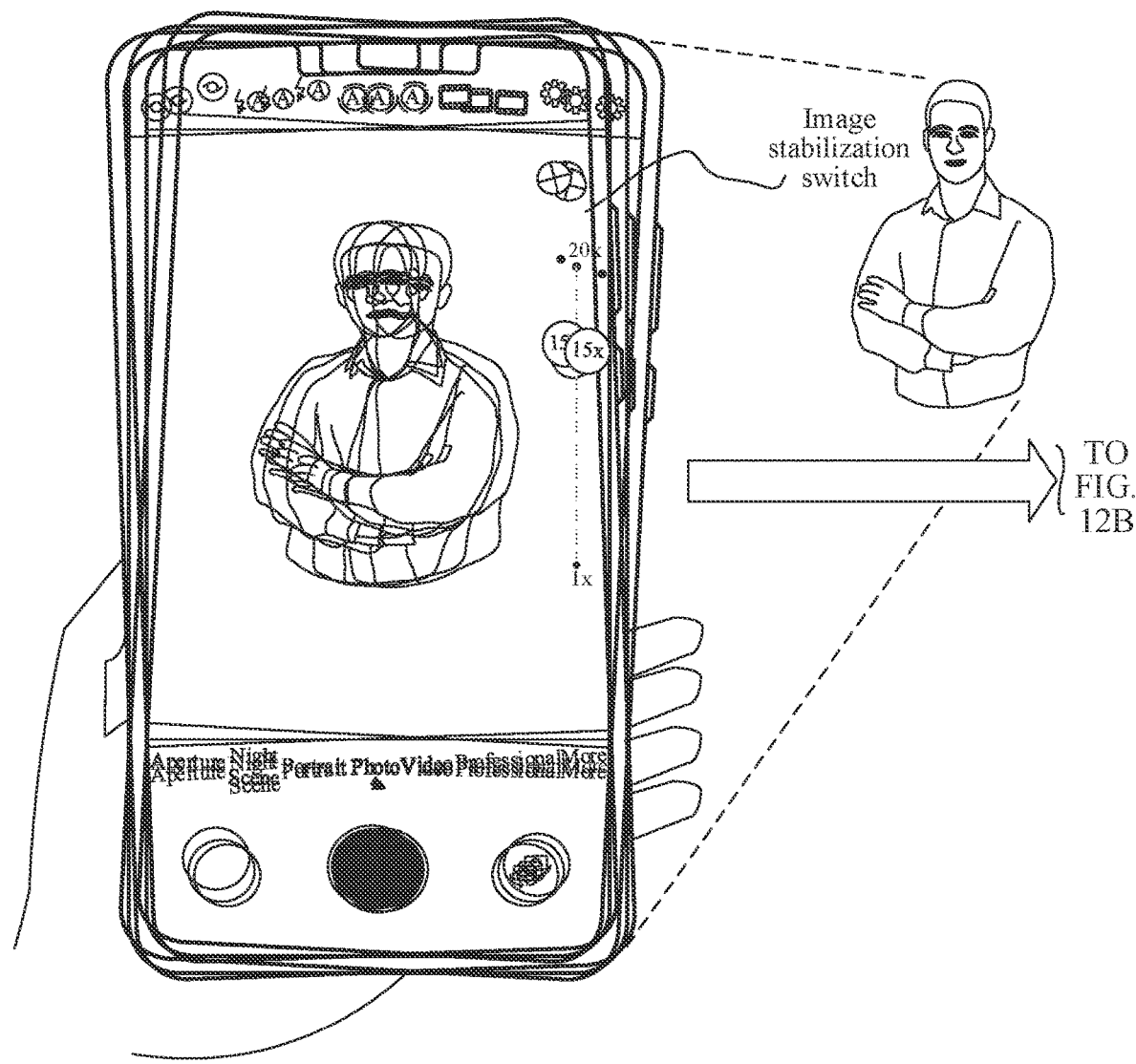
FIG. 12A and FIG. 12B are examples of an implementation of another image stabilization according to an embodiment of this application.
Figures 12A, 12B:
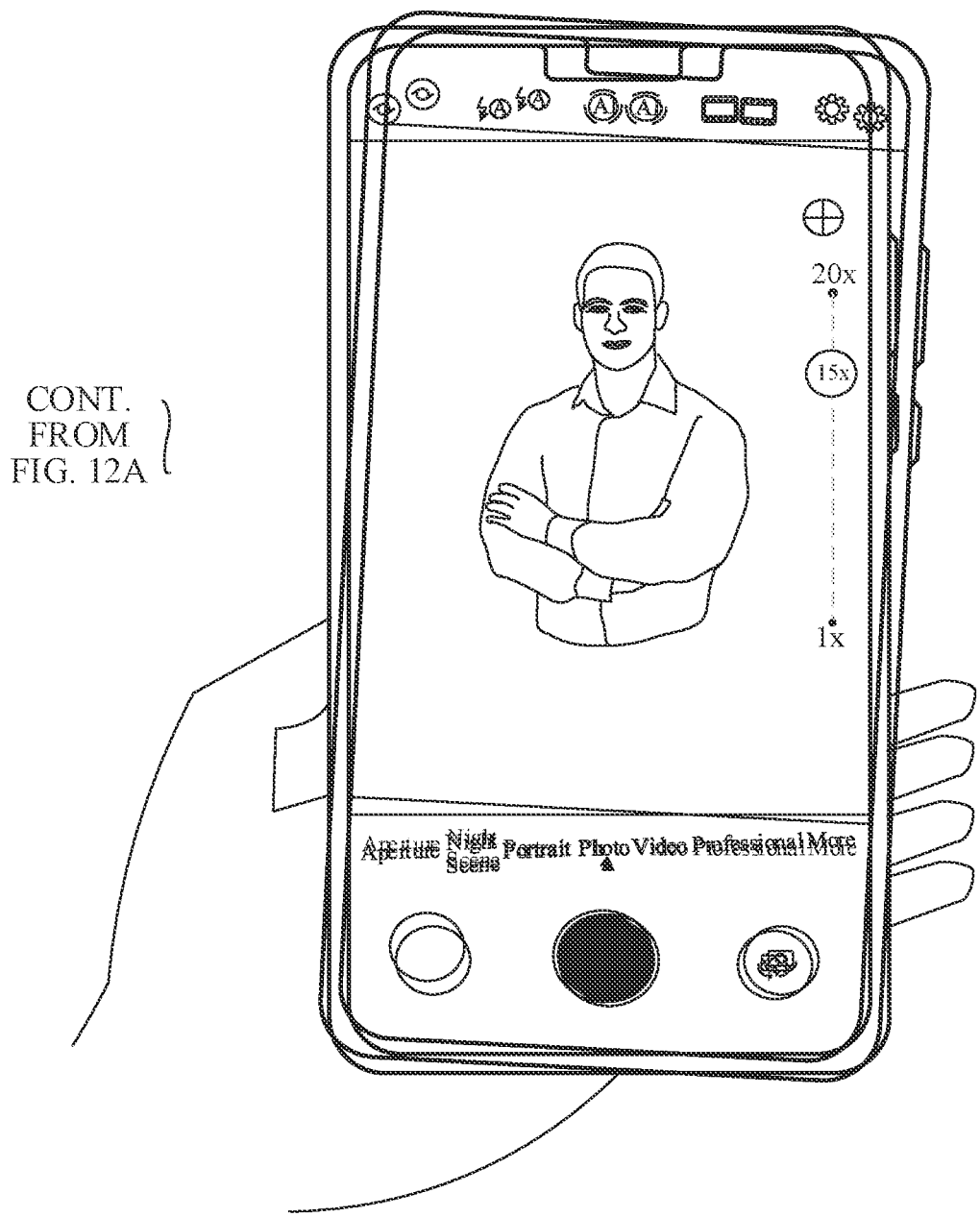

FIG. 12A and FIG. 12B are examples of an implementation of another image stabilization according to an embodiment of this application; The difference from FIG. 11 is that in FIG. 12A and FIG. 12B, an image stabilization switch is additionally arranged on the photo preview interface of the camera application. Before the image stabilization function is not turned on in the photo preview displayed in real time, that is, in the state of (a) in FIG. 12A, the image displayed on the photo preview interface of the camera application shakes with the shaking of the mobile phone, so that the image displayed on the phone screen becomes blurred and unclear. After the stabilization function is turned on, that is, in the state of (b) in FIG. 12B, even if there is the phone shake when holding the phone, it is still possible to ensure that the image of the photo preview interface can be output stably.

Figure 13:
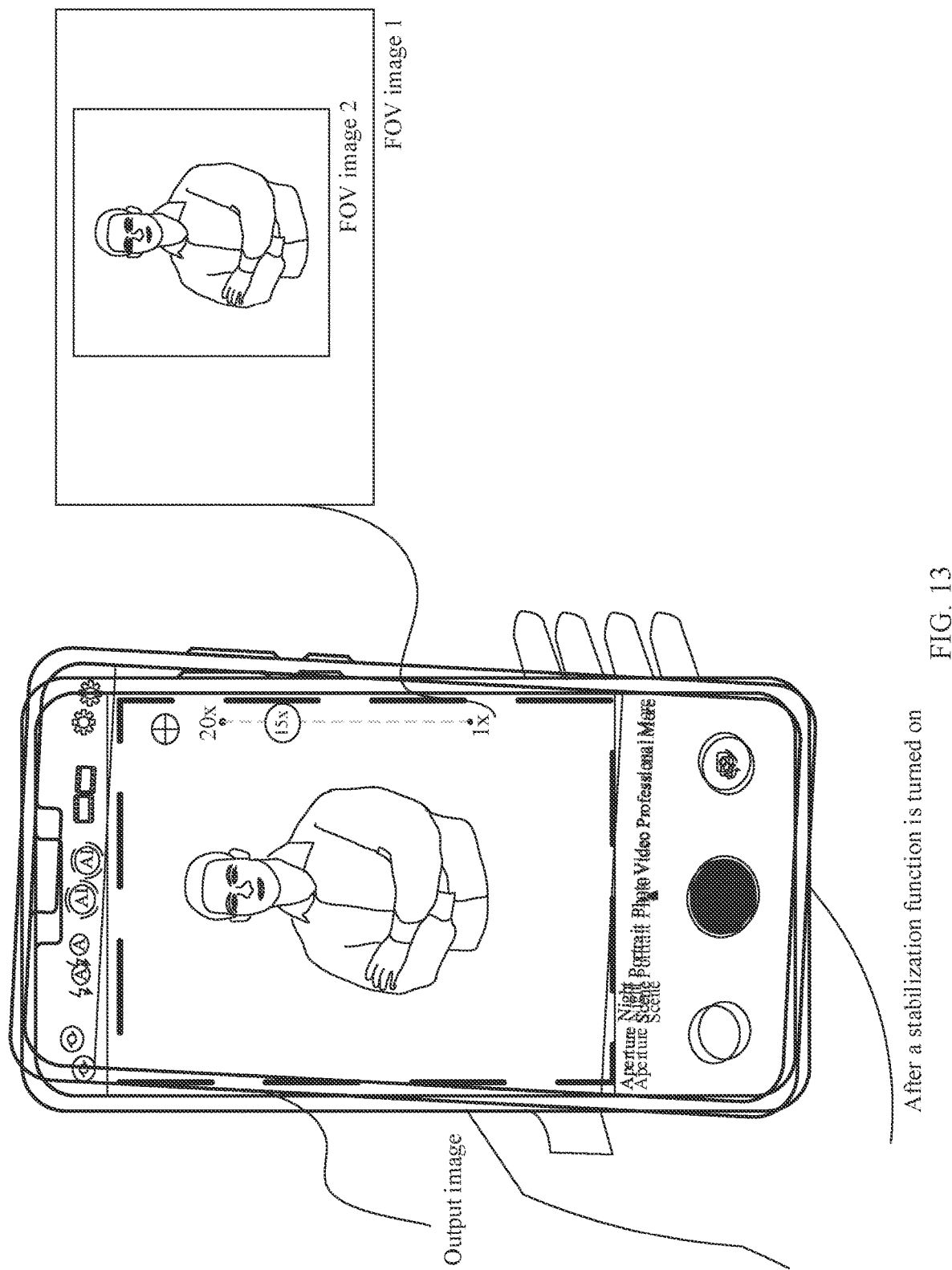
FIG. 13 is a schematic diagram of a field of view angle of FIG. 12A and FIG. 12B according to an embodiment of this application.

FIG. 13 is an example of a field of view (FOV) in the embodiment of FIG. 12. In response to the operation to open the camera application of the user, the camera is turned on. using a single camera as an example, a photographing range of the camera can be seen. After the user zooms in on the image of the photo preview interface to 15×, the photographing range is as shown in the FOV image 1 in the figure. The FOV image 1 is an image collected by the camera. After the image processing method of this application, the image displayed on the photo preview interface of the phone is outputted, that is, a FOV image 2 after image processing, that is, the output image in the figure.

Field of View (FOV) is used for indicating the image range of the camera during the process of photographing an image by the camera. If a to-be-photographed object is within the angle range, the to-be-photographed object is captured by the camera and displayed in the preview image. If a to-be-photographed object is not within the angle range, the to-be-photographed device is not captured by an image capture apparatus, that is, the device is not displayed in the preview image. Generally, if the field of view of the camera is large, the photographing range is large and the focal length is short. While if the field of view of the camera is small, the photographing range is small and the focal length is long.

In this application, the "field of view angle" may also be referred to as a term such as a "field of view range" and a "field of view range". This specification does not limit the name of the "field of view angle", as long the name expresses the above concept.

It should be noted that one or more cameras may be arranged, which is not limited herein. A form of the camera arranged in the electronic device is not limited, which may be a built-in camera or an external camera, and may be a front-facing camera or a rear camera.

It should be noted that when the camera includes a plurality of cameras, positions between the plurality of cameras can be placed arbitrarily. For example, the camera may be located on a left side or a right side of another camera, and the camera may also be located on an upper side or a lower side of another camera. That is to say, this application does not limit a relative positional relationship between any camera and another camera in a camera module.

Figure 14A:
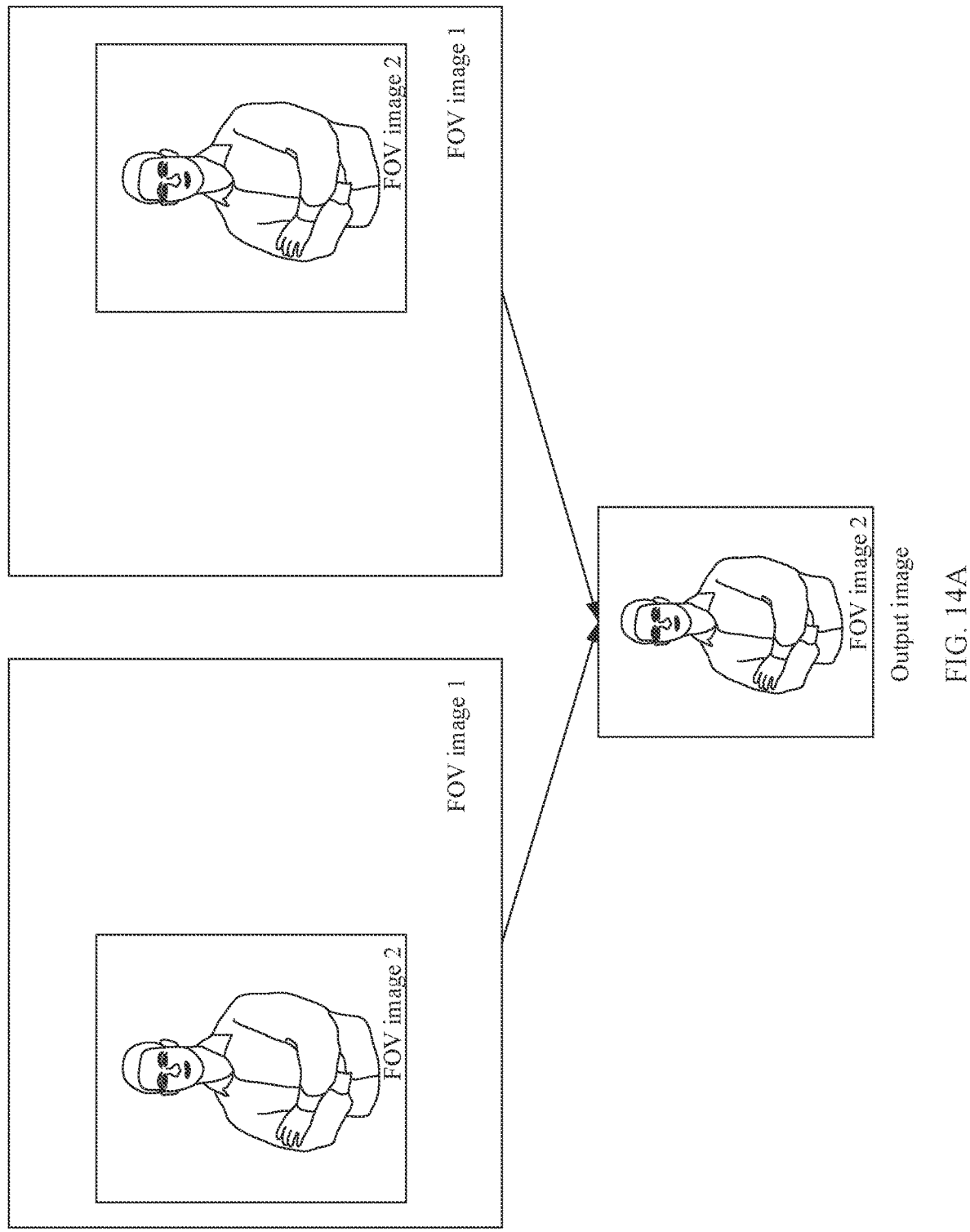
FIG. 14A is a schematic diagram of a camera image displacement imaging according to an embodiment of this application.
Figure 14B:
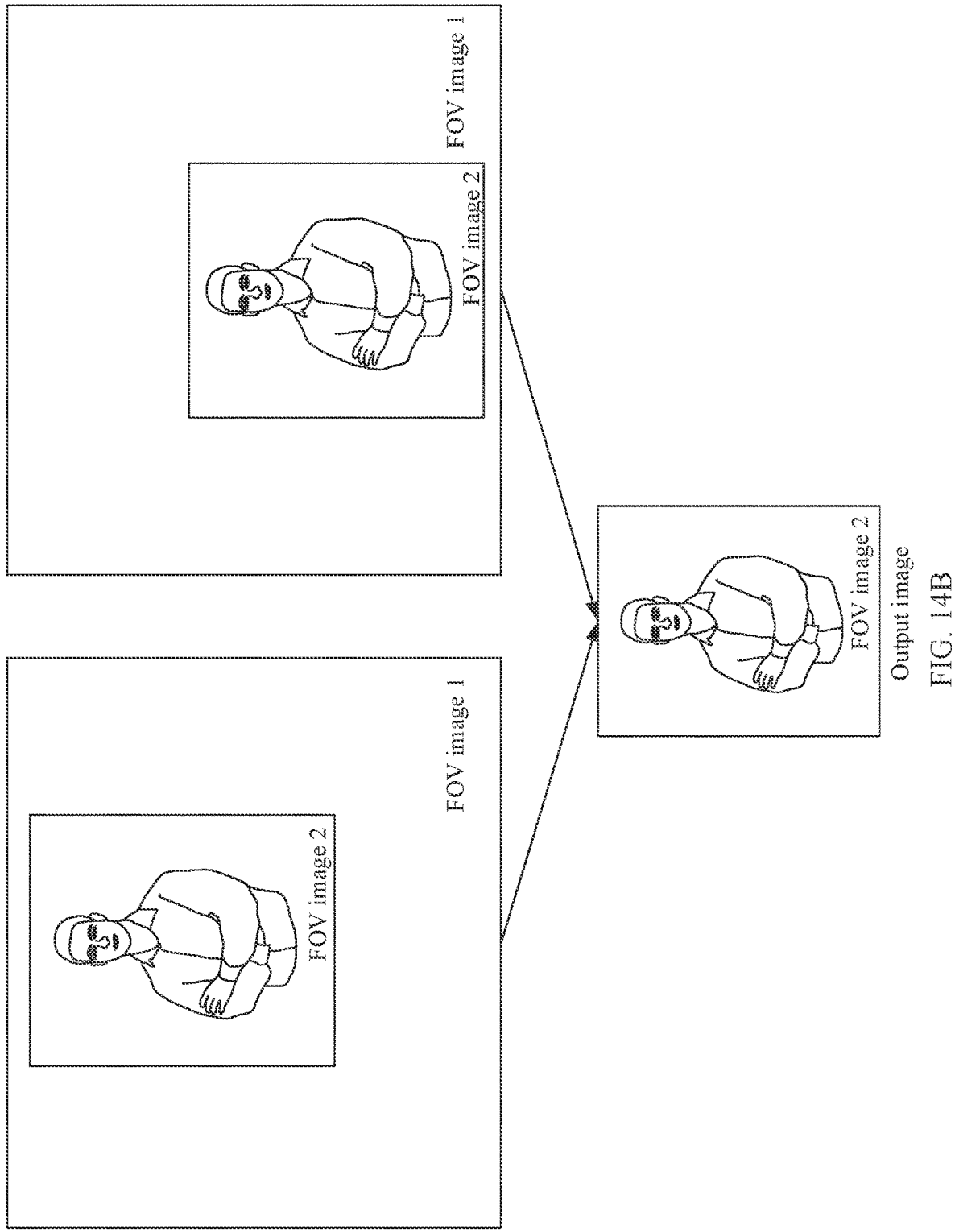
FIG. 14B is a schematic diagram of another camera image displacement imaging according to an embodiment of this application.
Figure 15:
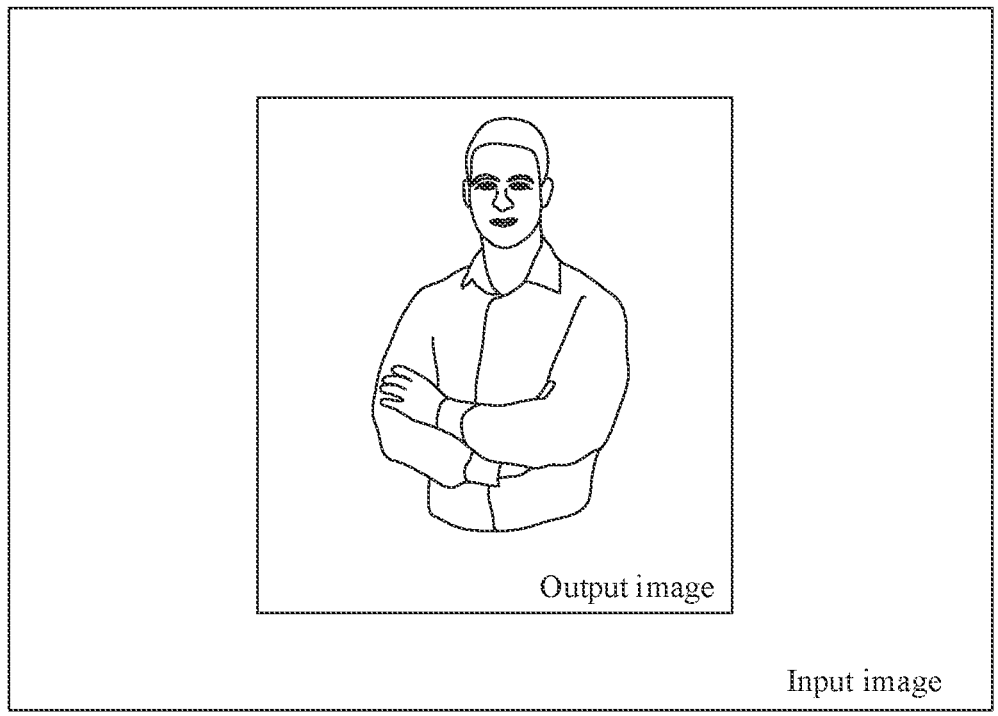
FIG. 15 is a schematic diagram of an input and output image according to an embodiment of this application.

FIG. 14A, FIG. 14B, and FIG. 15 are examples of camera image imaging in which the phone is displaced during the photographing process. FIG. 14A is a scenario in which the image is displaced left and right due to the hand shaking during the photographing process of the phone. After the image processing method of this application, the image displayed in real time on the photo preview interface of the camera application is a stable processed FOV image 2. FIG. 14B is a scenario in which the image is displaced up and down due to the hand shaking during the photographing process of the phone. After the image processing method of this application, the image displayed in real time on the photo preview interface of the camera application is a stable processed FOV image 2. As shown in FIG. 15, that is, the FOV image 1 is an input image, and the FOV image 2 is an output image displayed on the phone screen after the image processing method of this application.

Figure 16:
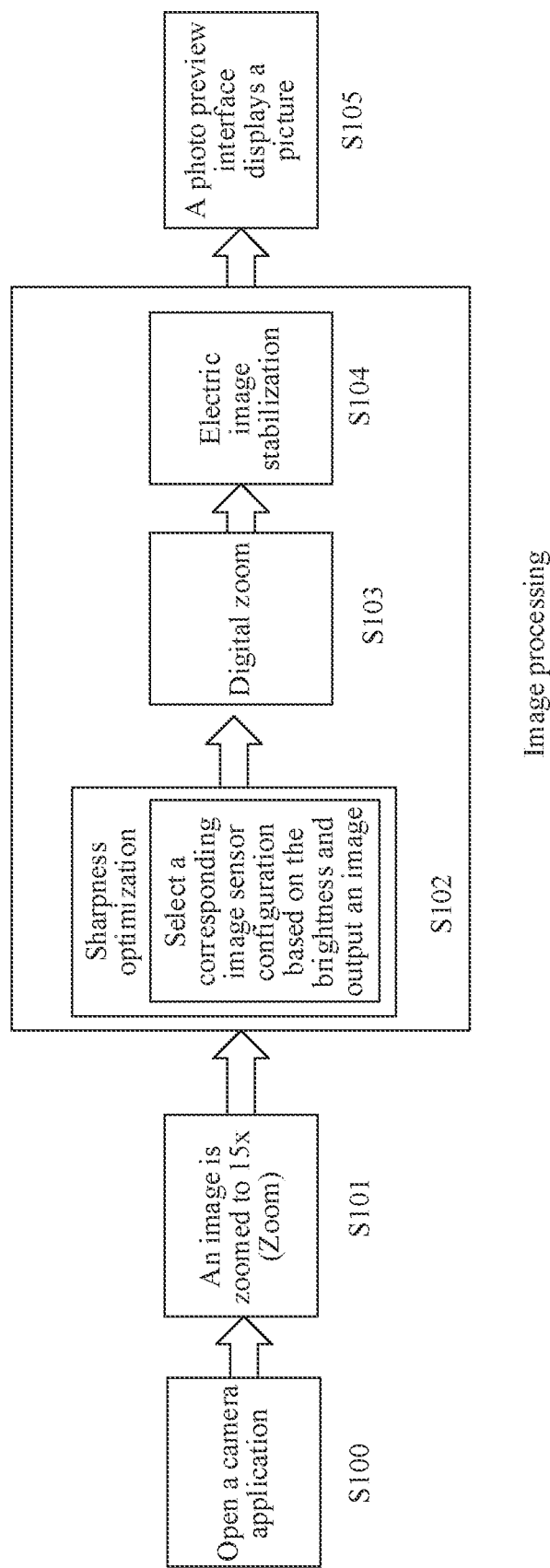
FIG. 16 is a schematic diagram of logical processing of an image processing according to an embodiment of this application.

FIG. 16 is a logical example of image processing according to an embodiment of this application. FIG. 10 illustrates steps S100 to S102 in detail. Details are not described herein again. In conjunction with FIG. 17 to FIG. 20, step S103 to step S105 are described in detail below. Specifically, the method includes the following steps.

S103: The digital zoom includes the ISP to scale the image to a user-selected zoom ratio to output.

S104: The electric image stabilization includes perform image stabilization on the received image.

S105: The processed image is outputted to the photo preview interface of the phone camera application for real-time display.

It should be noted that S104 can only turn on and perform the image stabilization on the output image when the zoom ratio of the user is greater than the preset image stabilization ratio. Generally speaking, when the zoom ratio is smaller than the preset image stabilization ratio, the image inputted by S102 is digitally zoomed by S103 and outputted to S105. Optionally, the preset image stabilization ratio that triggers S104 to turn on the image stabilization is 6× to 15×.

Figure 17:
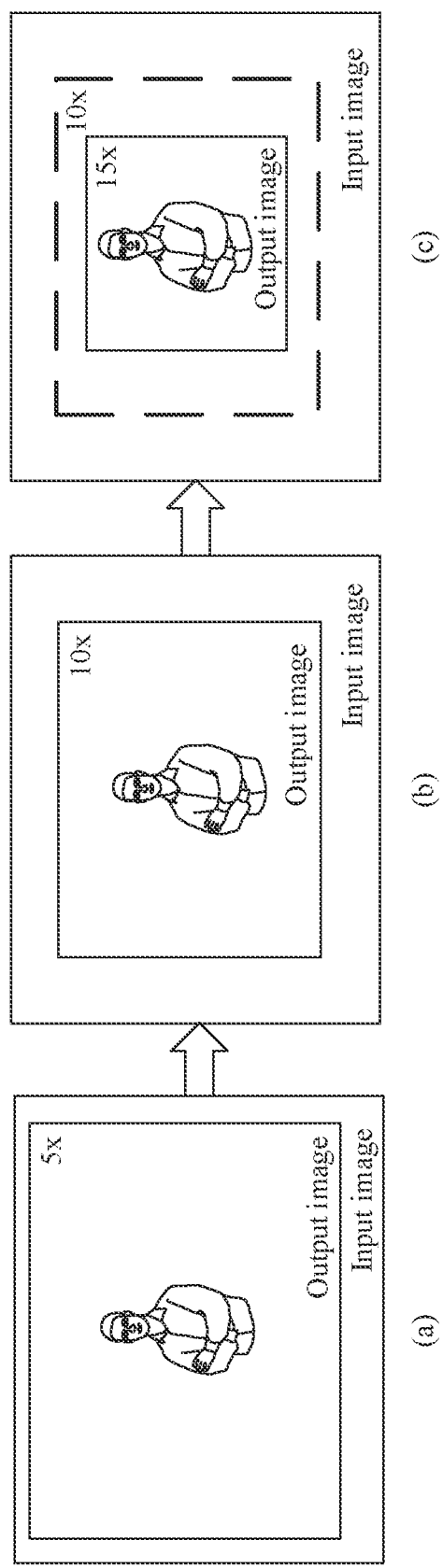
FIG. 17 is a schematic diagram of a relationship between an input image and an output image at different ratios according to an embodiment of this application.

FIG. 17 is an example of a relationship between the input image and the output image at different ratios, and further illustrates the preset image stabilization ratio that triggers the S104 to turn on. Taking dynamic cropping as an example, in the current embodiment, for example, when the zoom ratio of the user is greater than 10×, the algorithm for image stabilization is turned on, that is, step S104, and the processed image is outputted to S105 and displayed on the photo preview interface of the phone camera application. When the zoom ratio of the user is less than 10×, the input image is digitally zoomed through S103 and outputted to S105 to be displayed on the photo preview interface of the phone camera application. As shown in (a) in FIG. 17, under the photo preview interface of the phone camera application, when the user magnifies the current image to 5× (5×), the image is processed by the S103 digital zoom, and the output image is the actual enlarged image after 5× processing by S103. As shown in (b) in FIG. 17, under the photo preview interface of the phone camera application, when the user magnifies the current image to 10× (10×), the image is processed by the S103 digital zoom, and the output image is the actual enlarged image after 10× processing by S103. As shown in (c) in FIG. 17, under the photo preview interface of the phone camera application, when the user magnifies the current image to 15× (15×), since the zoom ratio is greater than the preset image stabilization ratio at this time, the electric image stabilization S104 is turned on. When the image is scaled to a dashed box in (c) in FIG. 17, that is, 10× (10×), the input image at the preset image stabilization ratio, that is, the input image at 10× (10×), is retained. As the image continues to be scaled to 15×, the electric image stabilization S104 crops the pixel to an image scaled to 15× selected by the user. It should be noted that the input image under the preset image stabilization ratio (that is 10×) is retained at 10× to reserve a larger activity for subsequent image scaling cropping to ensure the shake range of the image, thereby improving the image stability of the photo preview interface in the phone camera application now when zooming to the high ratio. After the image processing method disclosed in this application, an example is displayed on the photo preview interface of the phone camera application, that is, the output image.

Figure 18:
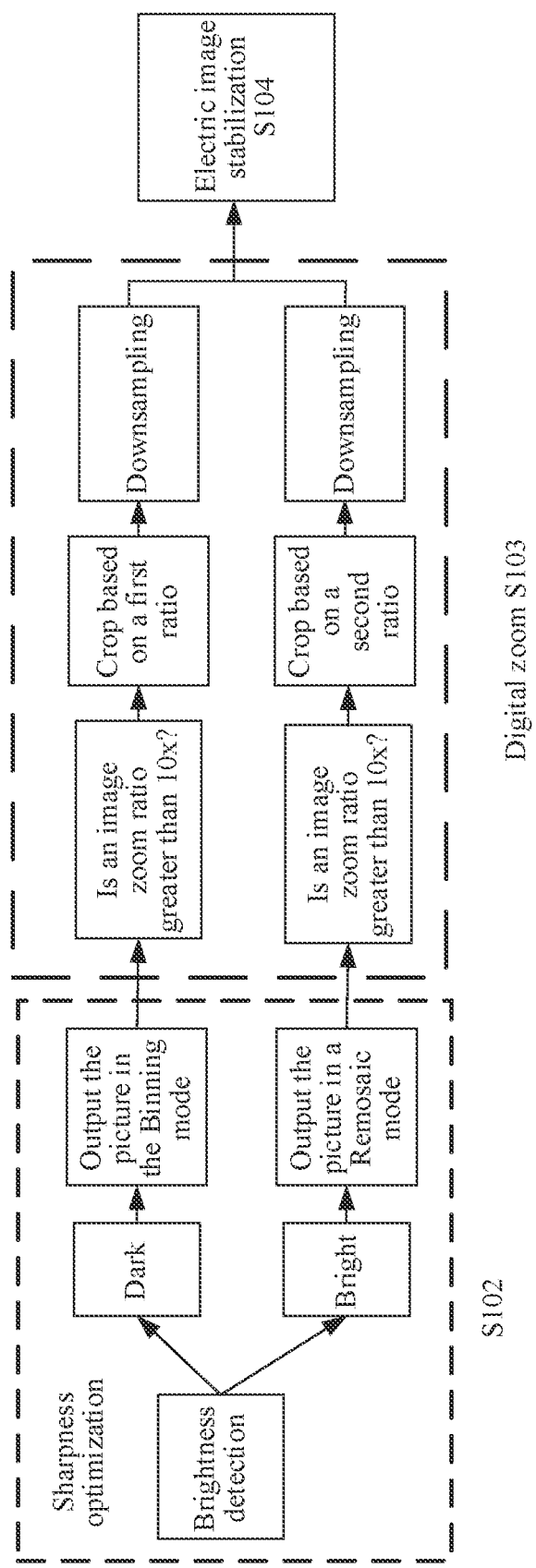
FIG. 18 is a schematic diagram of an implementation of a digital zoom according to an embodiment of this application.

As shown in FIG. 18, the implementation process of the digital zoom S103 is described in detail. It is obtained from step S102 that under the bright light condition and the dark light condition when the image is zoomed to 15×, the image sizes inputted to the digital zoom S103 are 4608*3456. For example, in the dark light condition, since the zoom ratio is 15×, the preset image stabilization ratio is 10×, and the telephoto ratio is 4×, the ISP cuts 4/10 based on a first ratio to obtain an image of 1842*1382. The ISP continues to downsample the above image by 0.78× to 1440*1080. For another example, in the bright light condition, since the zoom ratio is 15×, the preset image stabilization ratio is 10×, and the preset switching ratio is 8×, the ISP cuts 8/10 based on a second ratio to obtain an image of 3684*2764. The ISP continues to downsample the above image by 0.29× to 1440*1080.

Figure 19:
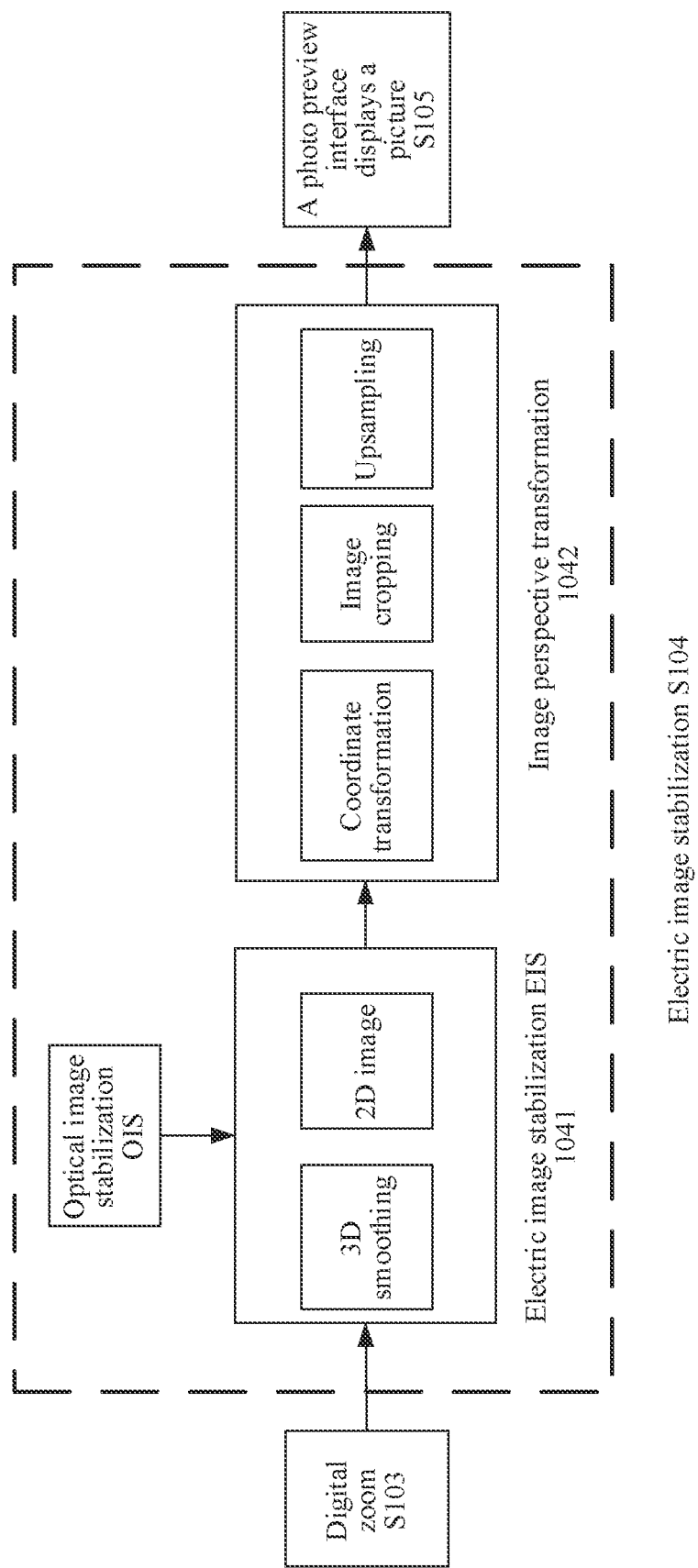
FIG. 19 is a schematic diagram of an implementation of an electric image stabilization according to an embodiment of this application.

As shown in FIG. 19, the implementation process of the electric image stabilization S104 is described in detail. The electric image stabilization S104 is performed by at least an electric image stabilization EIS 1041 module and an image perspective transformation 1042 module. Data information required for the electric image stabilization EIS 1041 includes a 3D smoothing, a 2D image, and an optical image stabilization OIS. The image perspective transformation 1042 includes coordinate transformation, pixel cropping, and upsampling. For example, combined with the image data in FIG. 18 as an example, since the zoom ratio is 15× and the preset image stabilization ratio is 10×, the ISP input image 1440*1080 is processed by the electric image stabilization EIS and then sent to the image perspective transformation. After coordinate transformation, the output image is cropped according to a ratio of 10/15 to 960*720, upsampled 1.5× to 1440*1080, and sent to the photo preview interface of the phone camera application for display S105. The image is a stable output image obtained after the image processing method of this application, which is consistent with the image pixel outputted by the ISP.

Figure 20:
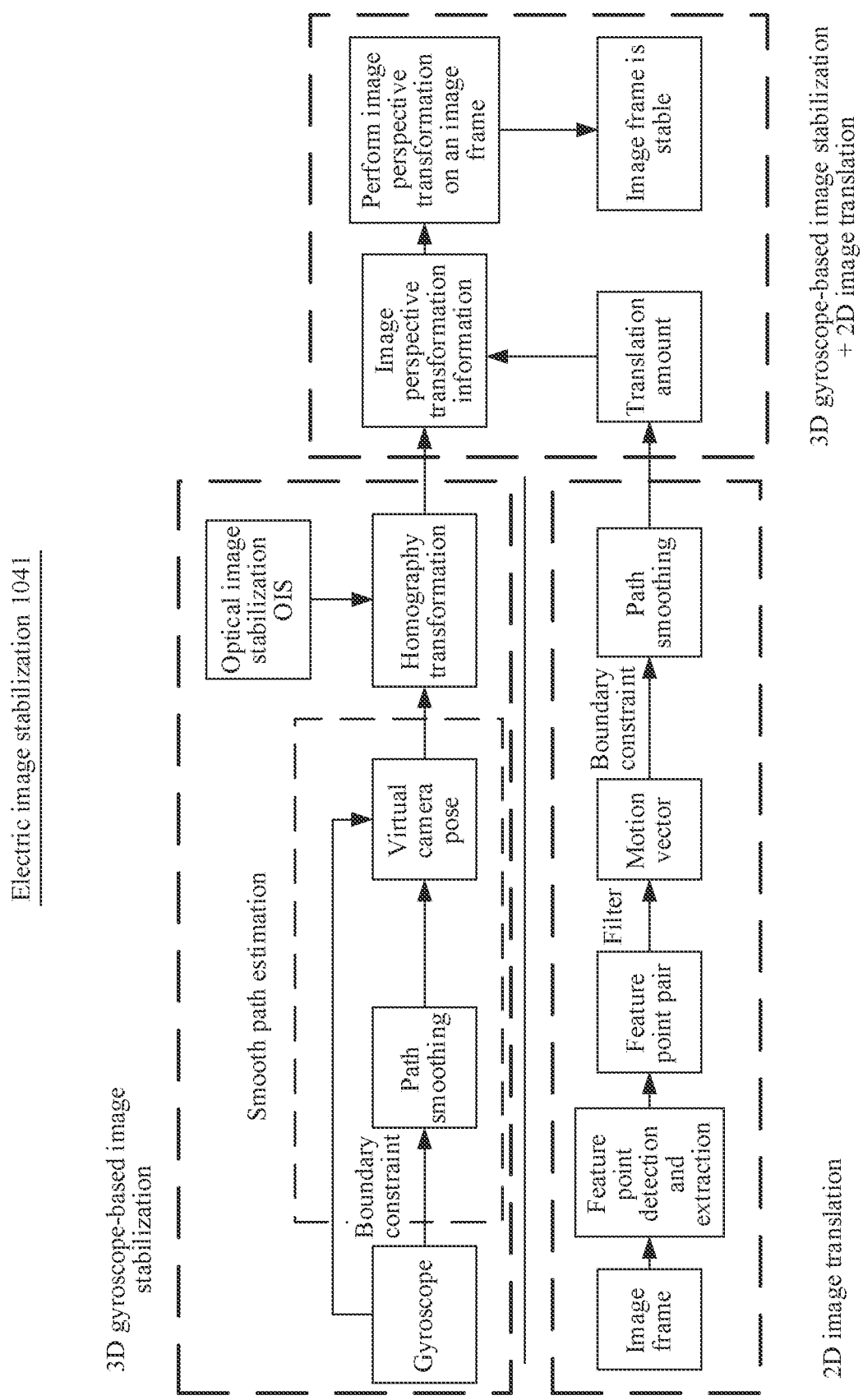
FIG. 20 is a schematic diagram of an electric image stabilization algorithm framework according to an embodiment of this application.

FIG. 20 is a schematic diagram of an electric image stabilization algorithm framework, including 3D gyroscope-based image stabilization and 2D image translation. The 3D gyroscope-based image stabilization includes a gyroscope, a boundary constraint, a path smoothing, and a virtual camera pose in turn. The gyroscope also outputs data to the virtual camera pose. The path smoothing and the virtual camera pose form a smooth path estimation. The virtual camera pose continues to output to the homography transformation, and output to the image perspective transformation information after receiving the data of the optical image stabilization OIS. The 2D image translation includes an image frame, which is outputted to a feature point for detecting and extracting, and then a pair of feature points is filtered to a motion vector, and then constrained by a boundary to the path smoothing to obtain a translation amount and then output to image perspective transformation information. After the image perspective transformation information receives the homography transformation of the 3D gyroscope and the translation amount of the 2D image translation, the image perspective transformation is performed on the image frame, and finally a stable image frame is outputted.

In an implementation of this application, for example, if the 3D gyroscope-based image stabilization is used for the image stabilization alone, the effect of the image stabilization cannot be achieved when an image stabilization intensity adjustment is weak. Or, when the image stabilization intensity adjustment is strong, the photo preview interface is delayed, and even when the user holds the phone to shoot with a strong degree of shaking, the picture is stagnant. For another example, if the 2D image translation is used, the image only collects content translation information of the image, and the image cannot perceive rotation information of the camera. For another example, if the 3D gyroscope-based image stabilization is used for achieving stabilization by cooperating with the OIS, it is easy to produce high-frequency jitter on the photo preview interface, resulting in poor stabilization effect on the photo preview interface and reduced user experience. Therefore, in the embodiment of this application, the high-frequency jitter that occurs in the photo preview interface can be adjusted by using the 3D gyroscope-based image stabilization and the 2D image translation to cooperate with each other, especially the 2D image translation.

Specifically, the 3D gyroscope-based image stabilization and the 2D image translation respectively control the 3D gyroscope-based image stabilization and the 2D image translation based on different zoom ratios set by the user, and dynamically adjust image weights of the 3D gyroscope-based image stabilization and the 2D image translation. The weight relationship between the 3D gyroscope-based image stabilization and the 2D image translation can be expressed by, for example, the following relationship:

3D gyroscope stabilization weight=1−2D image translation weight

The 2D image translation weight can be expressed by the following relationship:

2D image translation weight=(Zoom ratio set by current user−Initial zoom ratio)÷(Full-open ratio of 2D image translation−Initial zoom ratio)

It should be understood that when the user sets different zoom ratios, the weights of the 3D gyroscope-based image stabilization and the 2D image translation are adjusted accordingly, and the weight of the 3D gyroscope-based image stabilization gradually decreases with an increase of the zoom ratio set by the user. Correspondingly, the weight of the 2D image translation gradually increases with an increase of the zoom ratio set by the user. Until a 2D image translation maximization ratio is reached, the EIS only uses an image feature point for the image stabilization, and does not use the 3D gyroscope-based image stabilization. In this way, by controlling the weights of the 3D gyroscope-based image stabilization and the 2D image translation respectively, the cooperation of various parameters is dynamically considered during the photo preview interface, and the image stabilization of the photo preview interface is more flexibly controlled to achieve a better image stabilization effect.

It should be noted that the 2D image translation maximization ratio is a maximum ratio that can be supported by the 2D image translation, such as 50× or another zoom ratio, which is not limited here in this application.

For example, the initial zoom ratio set by the user is 1×, the zoom ratio set by the current user is 10×, and the full-open ratio of the 2D image is 50×, the weight of the 2D image translation is 9/49, and the weight of the 3D gyroscope-based image stabilization is 1−9/49, that is, 40/49. For another example, the initial zoom ratio set by the user is 1×, the zoom ratio set by the current user is 50×, and the full-open ratio of the 2D image is 50×, the weight of the 2D image translation is 49/49, and the weight of the 3D gyroscope-based image stabilization is 1−49/49, that is, 0. That is to say, when the zoom ratio set by the user is greater than or equal to the 2D image translation maximization ratio, the weight of the 3D gyroscope-based image stabilization is reduced to 0. That is to say, the 3D gyroscope-based image stabilization does not participate in the stabilization of the photo preview interface, but only participates in the stabilization of the photo preview interface by the 2D image translation. In this way, especially when the zoom ratio set by the user is high, the stabilization effect and benefit of the photo preview interface are more obvious.

Through the above implementation, when the user is in different zoom ratios, the picture displayed by the photo preview interface is more stable, reducing the image shake generated by the user when photographing with the handheld phone, so that the user can more conveniently see the content in the screen through the stable image. It should be noted that the image stabilization displayed by the photo preview interface is enhanced to make the picture more stable, so that the user can see the content in the picture clearly. The image stabilization does not adjust the clarity of the image, and the clarity of the image remains unchanged.

Figure 21:
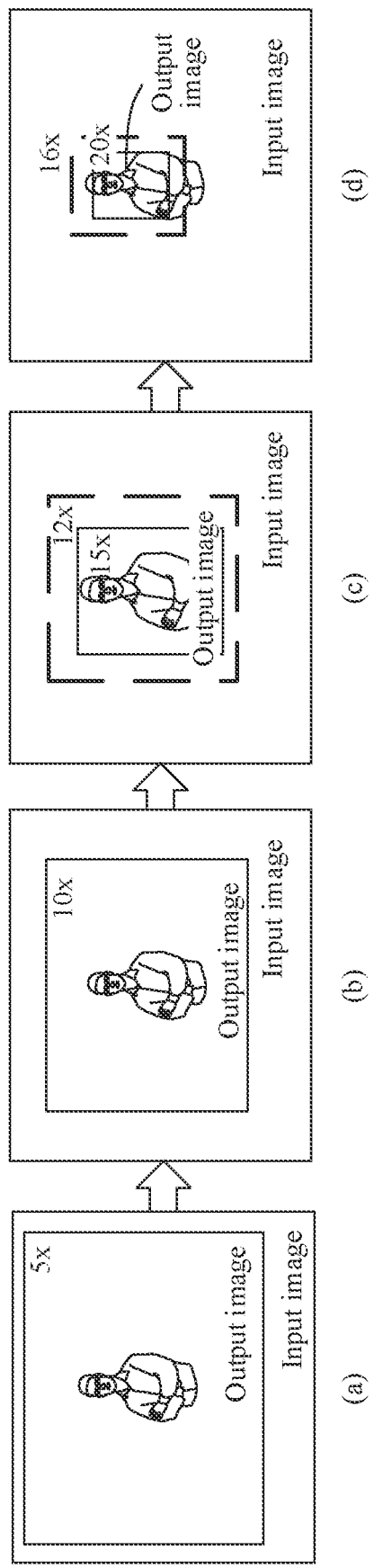
FIG. 21 is another implementation according to an embodiment of this application.

FIG. 21 is another embodiment of this application. The difference from the above embodiment is that, in this embodiment, a fixed cut can be made for the output image. In the current embodiment, for example, when the zoom ratio of the user is greater than 10×, the algorithm for image stabilization is turned on, that is, step S104, and the processed image is outputted to S105 and displayed on the photo preview interface of the phone camera application. When the zoom ratio of the user is less than 10×, the input image is digitally zoomed through S103 and outputted to S105 to be displayed on the photo preview interface of the phone camera application.

As shown in (a) in FIG. 21, under the photo preview interface of the phone camera application, when the user magnifies the current image to 5× (5×), the image is processed by the S103 digital zoom, and the output image is the actual enlarged image after 5× processing by S103. As shown in (b) in FIG. 21, under the photo preview interface of the phone camera application, when the user magnifies the current image to 10× (10×), the image is processed by the S103 digital zoom, and the output image is the actual enlarged image after 10× processing by S103. As shown in (c) in FIG. 21, under the photo preview interface of the phone camera application, when the user magnifies the current image to 15× (15×), since the zoom ratio is greater than the preset image stabilization ratio at this time, that is, the zoom ratio is greater than 10×, the electric image stabilization S104 is turned on. When the image is zoomed to (c) in FIG. 21, since it is fixed cropping in this case, in order to obtain the data after the actual output image is enlarged by the user to 15×, a moving range of an image with a preset ratio less than the 15× is necessarily to be reserved. In this embodiment, the preset ratio is 15× multiplied by a preset coefficient. For example, the preset coefficient is 80%, that is, when the output image is at the 80% ratio of 15×, that is, at the ratio of 12×, the input image at the preset ratio (that is, 12×) is retained, that is, the dashed box part in (c) in FIG. 21. As the image continues to be scaled to 15×, the electric image stabilization S104 crops the pixel to an image scaled to 15× selected by the user. It can be understood that a subsequent image scaling outputs the image based on the above manner. For example, as shown in (d) in FIG. 21, in order to obtain the image output image enlarged by 20× selected by the user, multiply the preset coefficient when the image is scaled to 20×, that is, 80% (16×), and retain the input image. As the image continues to be scaled to 20×, the electric image stabilization S104 crops the pixel to an image scaled to 20× selected by the user. Optionally, the preset coefficient is 60% to 90%. After the image processing method disclosed in this application, an example is displayed on the photo preview interface of the phone camera application, that is, the output image.

For example, the implementation process of the digital zoom S103 is described in detail. It is obtained from step S102 that under the bright light condition and the dark light condition when the image is zoomed to 15×, the image sizes inputted to the digital zoom S103 are 4608*3456. For example, in the dark light condition, since the zoom ratio is 15×, the preset image stabilization ratio is 10×, and a basic magnification of the telephoto lens is 10×, the ISP cuts 4/15 based on a first ratio to obtain an image of 1228*920. The ISP continues to upsample the above image by 1.41× to 1728*1296. For another example, in the bright light condition, since the zoom ratio is 15 times, the preset image stabilization ratio is 10 times, and the preset switching ratio is 8 times, the ISP cuts 4/15 based on a second ratio to obtain an image of 2456*1840. The ISP continues to downsample the above image by 0.7× to 1728*1296.

For example, the implementation process of the digital zoom S104 is described in detail. For example, combined with the image data outputted by the ISP in the above embodiment as an example, since the zoom ratio is 15× and the preset image stabilization ratio is 10×, the ISP input image 1728*1296 is processed by the electric image stabilization EIS, and sent to the image perspective transformation. After coordinate transformation, the output image is cropped by 20% to 1440*1080, and sent to the photo preview interface of the phone camera application for display S105. The image is a stable output image obtained after the image processing method of this application.

The implementation logic of this embodiment is consistent with FIG. 16, and details are not repeated herein.

Figure 22:
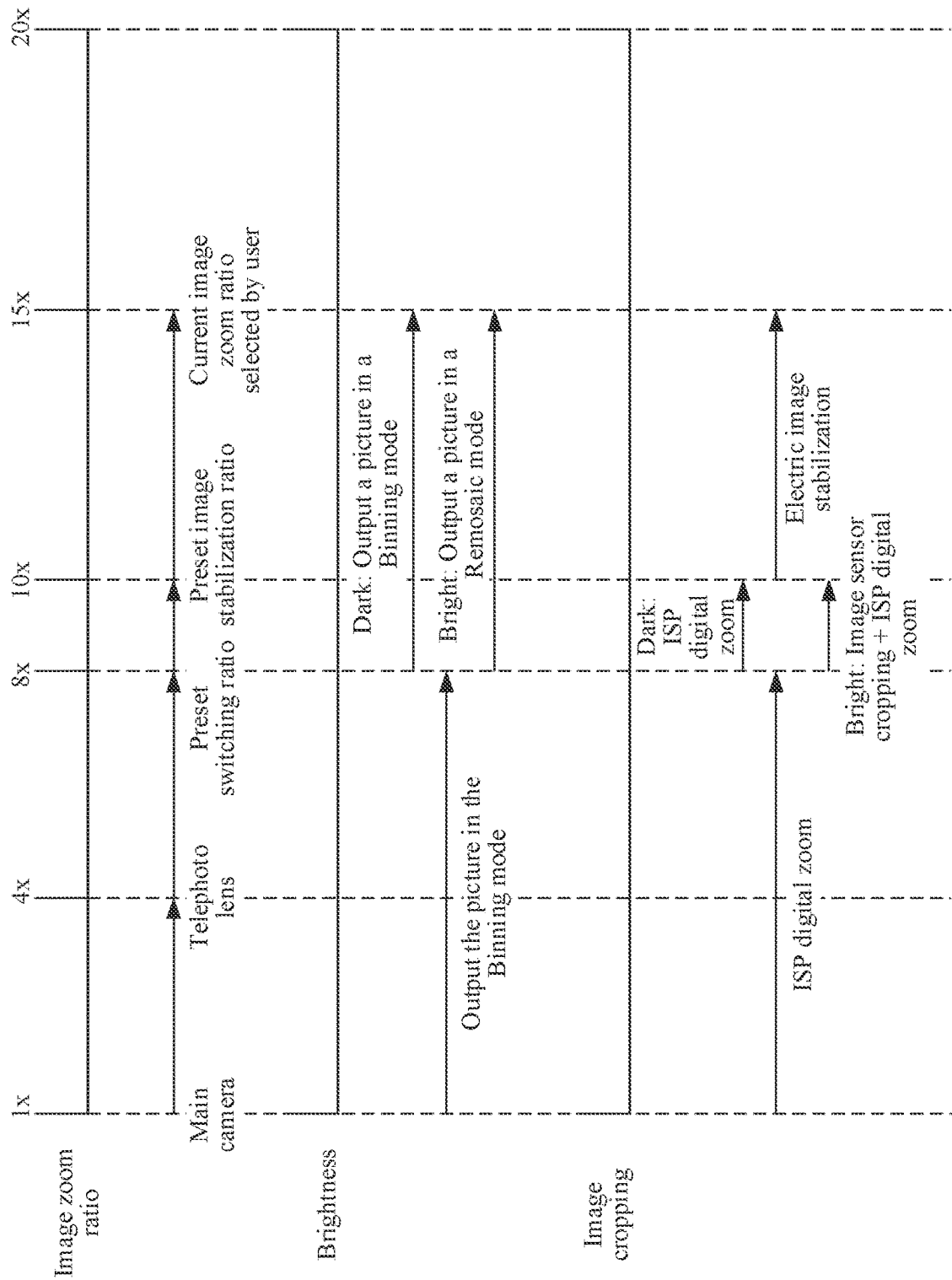
FIG. 22 is a schematic diagram of a logic implementation timing according to an embodiment of this application.

FIG. 22 is a time sequence diagram of logic implementation according to an embodiment of this application. As an example, the zoom ratio is implemented as follows. The elaboration is performed by using the zoom ratio selected by the user is 15×. Specifically, when the user opens the photo preview interface of the phone camera application, the zoom ratio of the initial interface of the camera application is 1×. In this case, a main camera collects the image within the photographing range of the phone. When the zoom ratio is enlarged to 4×, it is converted to a telephoto camera to collect the image within the photographing range of the phone. In this embodiment, as an example, the preset switching ratio is 8×, and the preset image stabilization ratio is 10×. It can be understood that the preset switching ratio and the ratio range of the preset image stabilization ratio can be changed based on different scenarios, which are described above and are not be repeated here.

Specifically, in the scenario of brightness detection, as an example, since the preset switching ratio currently set is 8×, the image outputs the picture in the Binning mode when the image zoom is less than 8×. When the image is zoomed to 8×, the brightness detection is performed. When it is detected that the current brightness is dark, the picture is outputted in the Binning mode, and when it is detected that the current brightness is bright, the picture is outputted in the Remosaic mode. It can be understood that the brightness detection is turned on when the image is zoomed to 8×, and when the zoom ratio is greater than 8×, the brightness is still continuously detected, and the picture output mode is switched based on the currently detected brightness.

Specifically, in a pixel cropped scenario, as an example, when the image is scaled less than 8 times, the image is scaled by the ISP digital zoom. Since the preset switching ratio is 8×, when the zoom ratio is between 8× and 10×, different picture output modes are switched based on different brightness, and the pixel cropping mode is different. Specifically, the image is zoomed by the ISP digital zoom under the dark light condition. Under bright light conditions, the input image is first cropped by the image sensor so that the output image under the bright light condition has the same ratio as the output image under the dark light condition. And then, the cropped image of the image sensor is outputted to the ISP digital zoom to scale the image. It can be understood that the output image is first cropped by the image sensor and then outputted to the ISP digital zoom, which can save the power consumption of the ISP. When the image zoom is greater than 10×, taking the dynamic cropping as an example, the image is cropped by the electric image stabilization.

Figure 23:
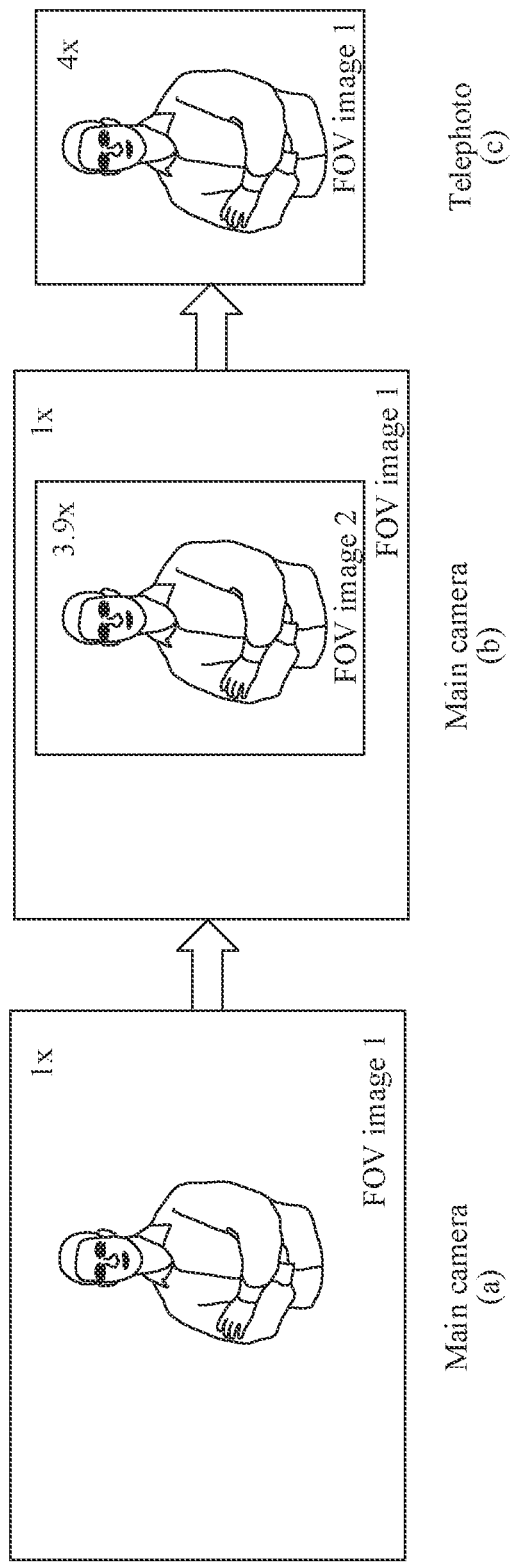
FIG. 23 is a schematic diagram of a different camera switching according to an embodiment of this application.

FIG. 23 is a schematic diagram of switching between the main camera and the telephoto camera when the zoom ratio is different. Specifically, when the zoom ratio is less than 4 times, the image is collected and obtained by the main camera. For example, as shown in (a) in FIG. 23, when the zoom ratio is 1×, the image is collected and obtained by the main camera. As shown in (b) in FIG. 23, when the zoom ratio is 3.9×, the main camera still captures and obtains the image. As shown in (c) in FIG. 23, when the zoom ratio is 4×, the telephoto camera captures and obtains the image.

Figure 24:
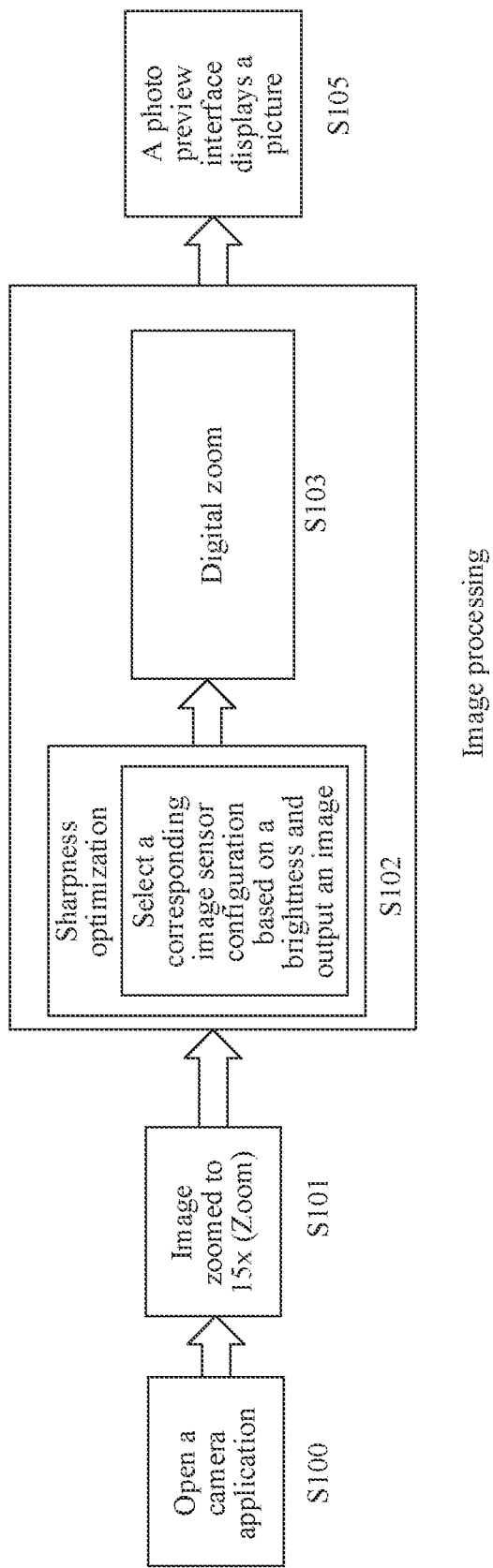
FIG. 24 is another implementation according to an embodiment of this application.

FIG. 24 is another embodiment of this application. In the scenario of this embodiment, as shown in FIG. 24, a difference from the previous embodiment is that the electric image stabilization S104 is not included. Therefore, the output and cropping of the image are completed by the S103 digital zoom.

For example, the current zoom ratio is 8× (instead of 15× in another embodiment of this application), and the basic ratio of the telephoto lens is, for example, 4×. The implementation process of the digital zoom S103 is described in detail. It is obtained from step S102 that under the bright light condition and the dark light condition when the image is zoomed to 8×, the image sizes inputted to the digital zoom S103 are 4608*3456. For example, in the dark light condition, the ISP crops 4/8 based on the first ratio to obtain a 2304*1728 image. The ISP continues to downsample the above image by 0.625× to 1440*1080. For another example, in the bright light condition, the ISP cuts 8/8 based on a second ratio to obtain an image of 4608*3456. The ISP continues to downsample the above image by 0.3125× to 1440*1080.

During specific implementation, this application further provides a computer storage medium. The computer storage medium may store a program. When the program is run, a device on which the computer readable storage medium is located is controlled to perform some or all of the steps in the foregoing embodiments. The storage medium may be a magnetic disk, an optical disc, a read-only memory (ROM), or a random access memory (RAM), and the like.

During specific implementation, embodiments of this application further provide a computer program product. The computer program product includes executable instructions. When the executable instructions are executed on a computer, the computer is enabled to perform some or all of the steps in the foregoing method embodiments.

The foregoing descriptions are merely specific embodiments of the present disclosure, and any variations or replacements that may readily occur to those skilled in the art within the scope of the present disclosure should fall within the protection scope of the present disclosure. The protection scope of the present disclosure shall be subject to the protection scope of the claims.

What is claimed is:

1. An image photographing method, comprising:
    displaying a first preview interface of a camera application, wherein the first preview interface comprises a first preview image, the first preview image is obtained after processing a first image collected by a camera, the first preview image corresponds to a first zoom ratio, and the first image corresponds to a first output mode of the camera;
    receiving a first operation performed by a user; and
    displaying a second preview interface of the camera application in response to the first operation, wherein the second preview interface comprises a second preview image, the second preview image is obtained after processing a second image collected by the camera, the second preview image corresponds to a second zoom ratio, the second image corresponds to a second output mode of the camera, the second output mode is different from the first output mode, and the second zoom ratio is different from the first zoom ratio;
    wherein the first output mode or the second output mode is determined based on a photographing brightness of the camera, wherein the photographing brightness comprises bright light or dark light;
    wherein the photographing brightness of the first preview interface and the second preview interface is bright light; and
    wherein the second zoom ratio is greater than a preset switching ratio.

2. The image photographing method according to claim 1, wherein the first output mode is one of Binning, Remosaic, Quadra, Quadra HDR, or Stagger HDR.

3. The image photographing method according to claim 1, wherein the second output mode is one of Binning, Remosaic, Quadra, Quadra HDR, or Stagger HDR.

4. The image photographing method according to claim 1, wherein the photographing brightness is determined based on a current ambient light brightness collected by an ambient light sensor.

5. The image photographing method according to claim 1, wherein the photographing brightness is determined based on average brightness information of the second preview image.

6. The image photographing method according to claim 1, wherein based on the photographing brightness being dark light, the first output mode and the second output mode are Binning.

7. The image photographing method according to claim 1, wherein based on the photographing brightness being bright light, the first output mode and the second output mode are Remosaic.

8. The image photographing method according to claim 1, further comprising:
    displaying, by the camera application, a third preview interface in response to the photographing brightness being switched to dark light, wherein the third preview interface corresponds to the first output mode.

9. The image photographing method according to claim 1, further comprising:
    receiving a second operation performed by a user; and
    displaying a fourth preview interface of the camera application in response to the second operation, wherein the fourth preview interface comprises a fourth preview image, the fourth preview image is obtained after processing a fourth image collected by the camera, the fourth preview image corresponds to a third zoom ratio, the fourth image corresponds to the first output mode of the camera, and the third zoom ratio is less than the preset switching ratio.

10. The image photographing method according to claim 1, further comprising:
    performing pixel cropping on the second image based on the second zoom ratio through performing digital zoom and electric image stabilization to obtain the second preview interface, wherein the second zoom ratio is greater than a preset image stabilization ratio.

11. The image photographing method according to claim 10, wherein the performing the digital zoom comprises performing pixel cropping based on the second zoom ratio and the second output mode.

12. The image photographing method according to claim 10, wherein the electric image stabilization comprises a 3D gyroscope, a 2D image feature point, and an image perspective transformation, and the 3D gyroscope is applicable to 3D image smoothing.

13. The image photographing method according to claim 12, wherein the pixel cropping is performed based on the second zoom ratio through the 3D gyroscope and the 2D image feature point.

14. The image photographing method according to claim 8, further comprising:
    performing pixel cropping on the second image based on the second zoom ratio through digital zoom and electric image stabilization to obtain the second preview interface, wherein the second zoom ratio is greater than a preset image stabilization ratio.

15. An electronic device, comprising:
    a memory configured to store computer program instructions; and
    a processor configured to execute the computer program instructions, wherein when the computer program instructions are executed by the processor, the electronic device is caused to perform operations comprising:
        displaying a first preview interface of a camera application, wherein the first preview interface comprises a first preview image, the first preview image is obtained after processing a first image collected by a camera, the first preview image corresponds to a first zoom ratio, and the first image corresponds to a first output mode of the camera;

receiving a first operation performed by a user; and displaying a second preview interface of the camera application in response to the first operation, wherein the second preview interface comprises a second preview image, the second preview image is obtained after processing a second image collected by the camera, the second preview image corresponds to a second zoom ratio, the second image corresponds to a second output mode of the camera, the second output mode is different from the first output mode, and the second zoom ratio is different from the first zoom ratio;

wherein the first output mode or the second output mode is determined based on a photographing brightness of the camera, wherein the photographing brightness comprises bright light or dark light;

wherein the photographing brightness of the first preview interface and the second preview interface is bright light; and wherein the second zoom ratio is greater than a preset switching ratio.

16. A non-transitory computer-readable storage medium storing a computer program, wherein the computer program, when run on a computer, causes the computer to perform operations comprising:

displaying a first preview interface of a camera application, wherein the first preview interface comprises a first preview image, the first preview image is obtained after processing a first image collected by a camera, the first preview image corresponds to a first zoom ratio, and the first image corresponds to a first output mode of the camera;

receiving a first operation performed by a user; and displaying a second preview interface of the camera application in response to the first operation, wherein the second preview interface comprises a second preview image, the second preview image is obtained after processing a second image collected by the camera, the second preview image corresponds to a second zoom ratio, the second image corresponds to a second output mode of the camera, the second output mode is different from the first output mode, and the second zoom ratio is different from the first zoom ratio;

wherein the first output mode or the second output mode is determined based on a photographing brightness of the camera, wherein the photographing brightness comprises bright light or dark light;

wherein the photographing brightness of the first preview interface and the second preview interface is bright light; and wherein the second zoom ratio is greater than a preset switching ratio.

17. The electronic device according to claim 15, wherein the first output mode is one of Binning, Remosaic, Quadra, Quadra HDR, or Stagger HDR.

18. The electronic device according to claim 15, wherein the second output mode is one of Binning, Remosaic, Quadra, Quadra HDR, or Stagger HDR.

19. The computer-readable storage medium according to claim 16, wherein the first output mode is one of Binning, Remosaic, Quadra, Quadra HDR, or Stagger HDR.

20. The computer-readable storage medium according to claim 16, wherein the second output mode is one of Binning, Remosaic, Quadra, Quadra HDR, or Stagger HDR.

* * * * *